United States Patent [19]

Scartazzini et al.

[11] 3,880,833

[45] Apr. 29, 1975

[54] CERTAIN BIS-(3-AMINO-2-OXO-1-AZETIDINYL)-DISULFIDES

[75] Inventors: Riccardo Scartazzini, Allschwil; Hans Bickel, Binningen; Karl Heusler, Basel, all of Switzerland; Robert Burns Woodward, Cambridge, Mass.

[73] Assignee: Ciba-Geigy Corporation, Ardsley, N.Y.

[22] Filed: Oct. 12, 1971

[21] Appl. No.: 188,511

[30] Foreign Application Priority Data
Oct. 27, 1970 Switzerland.................... 15846/70
Mar. 4, 1971 Switzerland...................... 3196/71

[52] U.S. Cl...... 260/239 A; 204/158 R; 260/243 C; 260/306.7 R; 260/332.2 H; 424/246

[51] Int. Cl............................................. C07d 25/02
[58] Field of Search................................. 260/239 A

[56] References Cited
UNITED STATES PATENTS
3,679,676  7/1972  Heusler et al.................. 260/239 A

*Primary Examiner*—Alton D. Rollins
*Attorney, Agent, or Firm*—Joseph G. Kolodny

[57] ABSTRACT

The invention concerns the manufacture of bis-(cis-3-amino-2-oxo-1-azetidinyl)-disulfides and corresponding N-protected derivatives thereof by oxidation of 4-thia-2,6-diaza-bicyclo[3.2.0]heptan-6-ones and, if desired, protection, e.g. acylation, of the amino group. The products are intermediates for the manufacture of 7-amino-ceph-3-em-4-carboxylic acid compounds with antibiotic properties.

3 Claims, No Drawings

CERTAIN BIS-(3-AMINO-2-OXO-1-AZETIDINYL)-DISULFIDES

The subject of the present invention is the manufacture of bis-(cis-3-amino-2-oxo-4-azetidinyl)-disulphide compounds of the formula

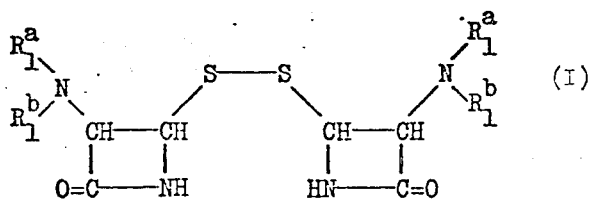

wherein $R_1{}^a$ represents hydrogen or an amino protective group $R_1{}^A$, $R_1{}^b$ represents hydrogen or an acyl group Ac, or wherein $R_1{}^A$ and $R_1{}^b$ together represent a bivalent amino protective group, or salts of such compounds having salt-forming groups.

An amino protective group $R_1{}^A$ is a group which can be replaced by hydrogen, above all an acyl group Ac, and also a triarylmethyl group, especially a trityl group, furthermore an organic silyl or stannyl group. A group Ac above all represents the acyl radical of an organic carboxylic acid, especially the acyl radical of an optionally substituted aliphatic, cycloaliphatic, cycloaliphatic-aliphatic, aromatic, araliphatic, heterocyclic or heterocyclic-aliphatic carboxylic acid (including formic acid), or the acyl radical of a carbonic acid half-derivative.

An amino protective group formed by the radicals $R_1{}^A$ and $R_1{}^b$ together is, for example, the bivalent acyl radical of an organic dicarboxylic acid, primarily the diacyl radical of an aliphatic or aromatic dicarboxylic acid, furthermore the acyl residue of an α-amino-acetic acid, which preferably contains in α-position for example, an aromatic or heterocyclic residue and in which the amino group is linked with the nitrogen atom via a methylene residue preferably substituted, for example, by two lower alkyl, e.g. methyl groups.

The residues $R_1{}^A$ and $R_1{}^b$ may also form together an organic, preferably aliphatic as well as a cycloaliphatic, cycloaliphatic-aliphatic or araliphatic ylidene residue; in other words, $R_1{}^A$ and $R_1{}^b$ together form an optionally substituted methylene residue, which contains as substituents one or two monovalent or a divalent, optionally substituted hydrocarbon residue, particularly an optionally substituted aliphatic hydrocarbon residue.

In the above description and following, the generic expressions used have, for example, the following meaning:

An aliphatic radical of an appropriate organic carboxylic acid, which term also includes formic acid, as well as a corresponding ylidene residue, is an optionally substituted monovalent or divalent aliphatic hydrocarbon radical, especially lower alkyl as well as lower alkenyl or lower alkinyl, furthermore lower alkylidene, which can, for example, contain up to 7, preferably up to 4, carbon atoms. Such radicals can optionally be monosubstituted, disubstituted or polysubstituted by functional groups, for example by free, etherified or esterified hydroxyl or mercapto groups, such as lower alkoxy, lower alkenyloxy, lower alkylenedioxy, optionally substituted phenyloxy or phenyl-lower alkoxy, lower alkyl-thio or optionally substituted phenylthio or phenyl-lower alkylthio, lower alkoxycarbonyloxy or lower alkanoyloxy or halogeno, or by oxo, nitro, optionally substituted amino, e.g. lower alkyl-amino, di-lower alkyl-amino, lower alkylene-amino, oxa-lower alkylene-amino or aza-lower alkylene-amino, furthermore, acyl-amino, such as lower alkanoylamino, optionally substituted carbamoylamino, ureidocarbonylamino or guanidino-carbonylamino, azido, acyl, such as lower alkanoyl or benzoyl, optionally functionally modified carboxyl, such as carboxyl present in the salt form or lower alkoxycarbonyl, optionally N-substituted carbamoyl, such as N-lower alkylcarbamoyl or N,N-di-lower alkylcarbamoyl, furthermore optionally substituted ureidocarbonyl or guanidinocarbonyl, or cyano, or optionally functionally modified sulpho, such as sulphamoyl or sulpho present in salt form. A divalent aliphatic residue of an organic carboxylic acid is, for example, lower alkylene or lower alkenylene, which may be mono-, di- or polysubstituted, e.g. as the above monovalent aliphatic residues.

A cycloaliphatic or cycloaliphatic-aliphatic radical in an appropriate organic carboxylic acid or a corresponding cycloaliphatic or cycloaliphatic-aliphatic ylidene residue is an optionally substituted mono- or divalent cycloaliphatic or cycloaliphatic-aliphatic hydrocarbon radical, for example, monocyclic, bicyclic or polycyclic cycloalkyl or cycloalkenyl, furthermore cycloalkylidene, or cycloalkyl- or cycloalkenyl-lower alkyl or -lower alkenyl, as well as cycloalkyl- or cycloalkenyl-lower alkylidene, wherein cycloalkyl for example contains up to 12, such as 3–8, preferably 3–6, ring carbon atoms, whilst cycloalkenyl for example contains up to 12, such as 3–8, for example 5–8, preferably 5 or 6, ring carbon atoms, as well as 1 to 2 double bonds, and the aliphatic portion of a cycloaliphatic-aliphatic radical can, for example, contain up to 7, preferably up to 4, carbon atoms. The above cycloaliphatic or cycloaliphatic-aliphatic radicals can, if desired, be monosubstituted, disubstituted or polysubstituted, for example by optionally substituted aliphatic hydrocarbon radicals, such as by the abovementioned, optionally substituted lower alkyl groups, or by functional groups, for example like the abovementioned aliphatic hydrocarbon radicals.

The aromatic radical in an appropriate carboxylic acid is an optionally substituted hydrocarbon radical, for example a monocyclic, bicyclic or polycyclic aromatic hydrocarbon radical, especially phenyl, as well as biphenylyl or naphthyl, which can optionally be monosubstituted, disubstituted or polysubstituted, for example like the abovementioned aliphatic and cycloaliphatic hydrocarbon radicals.

The divalent residue of an aromatic carboxylic acid is primarily 1,2-arylene, especially 1,2-phenylene, which may optionally be mono-, di- or polysubstituted e.g. as the above mentioned aliphatic or cycloaliphatic hydrocarbon residue.

The araliphatic radical in an appropriate carboxylic acid, furthermore an araliphatic ylidene residue is, for example, an optionally substituted araliphatic hydrocarbon radical, such as an optionally substituted aliphatic hydrocarbon radical which for example possesses up to three, optionally substituted, monocyclic, bicyclic or polycyclic aromatic hydrocarbon radicals, and primarily represents phenyl-lower alkyl or phenyl-lower alkenyl radical, as well as phenyl-lower alkinyl, furthermore phenyl-lower alkylidene, such radicals containing, for example, 1–3 phenyl groups and being optionally monosubstituted, disubstituted or polysubstituted in the aromatic and/or aliphatic portion, for example like the abovementioned aliphatic and cycloaliphatic radicals.

Heterocyclic groups, including those in heterocyclic-aliphatic radicals, in appropriate carboxylic acids are especially monocyclic, as well as bicyclic or polycyclic, aza-, thia-, oxa-, thiaza-, oxaza-, diaza-, triaza-, thiadiaza- or tetrazacyclic radicals, preferably of aromatic character, furthermore corresponding partially or totally saturated residues, which can optionally be monosubstituted, disubstituted or polysubstituted, for example like the abovementioned cycloaliphatic radicals. The aliphatic portion in heterocyclic-aliphatic radicals for example has the meaning indicated for the corresponding cycloaliphatic-aliphatic or araliphatic radicals.

The acyl radical of a carbonic acid half-derivative is preferably the acyl radical of a carbonic acid half-ester, wherein the organic radical of the ester group represents an optionally substituted aliphatic, cycloaliphatic, aromatic or araliphatic hydrocarbon radical or a heterocyclic-aliphatic radical, above all the acyl radical of a lower alkyl half-ester of carbonic acid which is optionally substituted, for example in the α- or β-position, as well as of a lower alkenyl, cycloalkyl, phenyl or phenyl-lower alkyl half-ester of carbonic acid which is optionally substituted in the organic portion. Acyl radicals of a carbonic acid half-ester are furthermore appropriate radicals of lower alkyl half-esters of carbonic acid in which the lower alkyl portion contains a heterocyclic group, for example one of the abovementioned heterocyclic groups of aromatic character, it being possible for both the lower alkyl radical and the heterocyclic group to be optionally substituted.

The acyl residue of a carbonic acid half-derivative may also be an optionally N-substituted carbamoyl group, such as optionally halogenated N-lower alkylcarbamoyl.

A lower alkyl radical is, for example, a methyl, ethyl, n-propyl, isopropyl, n-butyl, isobutyl, sec.-butyl or tert.-butyl as well as n-pentyl, isopentyl, n-hexyl, isohexyl or n-heptyl group, whilst a lower alkenyl radical can, for example, be a vinyl, allyl, isopropenyl, 2- or 3-methallyl or 3-butenyl group, and a lower alkinyl radical can, for example, be a propargyl or 2-butinyl group, whereas lower alkylidene is, for example, isopropylidene or isobutylidene.

A lower alkylene radical is, for example, a 1,2-ethylene, 1,2- or 1,3-propylene, 1,4-butylene or 1,5-pentylene radical, and a lower alkenylene radical is, for example, a 2-buten-1,4-ylene radical.

A cycloalkyl group is, for example, a cyclopropyl, cyclobutyl, cyclopentyl, cyclohexyl or cycloheptyl, as well as adamantyl group and a cycloalkenyl group is, for example, a 2-cyclopropenyl, 2- or 3-cyclopentenyl, 1-, 2- or 3-cyclohexenyl, 3-cycloheptenyl or 1,4-cyclohexadienyl group; cycloalkylidene is e.g. cyclopentylidene or cyclohexylidene. A cycloalkyl-lower alkyl or -lower alkenyl radical is, for example, a cyclopropyl-, cyclopentyl-, cyclohexyl- or cycloheptyl-methyl, -1,1- or -1,2-ethyl, -1,1-, -1,2- or 1,3-propyl, -vinyl or -allyl group, whilst a cycloalkenyl-lower alkyl or -lower alkenyl group for example represents a 1-, 2- or 3-cyclopentyl-, 1-, 2- or 3-cyclohexenyl- or 1-, 2- or 3-cycloheptenyl-methyl, -1,1- or -1,2-ethyl, -1,1-, -1,2- or -1,3-propyl, -vinyl or -allyl group.

A naphthyl radical is a 1- or 2-naphthy) radical, whilst a biphenylyl group for example represents a 4-biphenylyl radical.

A phenyl-lower alkyl radical is, for example, a benzyl, 1- or 2-phenylethyl, 1-, 2- or 3-phenylpropyl, diphenylmethyl or trityl radical, a naphthyl-lower alkyl radical e.g. 1- or 2-naphthylmethyl, a phenyl-lower alkenyl group e.g. styryl or cinnamyl radical, and a phenyl-lower alkylidene radical e.g. benzylidene.

Heterocyclic radicals are above all optionally substituted heterocyclic radicals of aromatic character, for example, corresponding monocyclic, monoazacyclic, monothiacyclic or monooxacyclic radicals, such as pyrryl, for example 2-pyrryl or 3-pyrryl, pyridyl, for example 2-, 3- or 4-pyridyl, and also pyridinium, thienyl, for example 2- or 3-thienyl, or furyl, for example 2-furyl, corresponding bicyclic monoazacyclic, monooxacyclic or monothiacyclic radicals, such as indolyl, for example 2- or 3-indolyl, quinolinyl, for example 2- or 4-quinolinyl, isoquinolinyl, for example 1-isoquinolinyl, benzofuranyl, for example 2- or 3-benzofuranyl, or benzothienyl, for example 2- or 3-benzothienyl, monocyclic diazacyclic, triazacyclic, tetrazacyclic, thiazacyclic, thiadiazacyclic or oxazacyclic radicals, such as imidazolyl, for example 2-imidazolyl, pyrimidinyl, for example 2- or 4-pyrimidinyl, triazolyl, for example 1,2,4-triazol-3-yl, tetrazolyl, for example 1- or 5-tetrazolyl, oxazolyl, for example 2-oxazolyl, isoxazolyl, for example 3-isoxazolyl, thiazolyl, for example 2-thiazolyl, isothiazolyl, for example 3-isothiazolyl, or 1,2,4- or 1,3,4-thiadiazolyl, for example 1,2,4-thiadiazol-3-yl or 1,3,4-thiadiazol-2-yl, or bicyclic diazacyclic, thiazacyclic or oxazacyclic radicals, such as benzimidazolyl, for example 2-benzimidazolyl, benzoxazolyl, for example 2-benzoxazolyl, or benzthiazolyl, for example 2-benzthiazolyl. Appropriate partially or totally saturated radicals are, for example, tetrahydrothienyl, such as 2-tetrahydrothienyl, tetrahydrofuryl, such as 2-tetrahydrofuryl, or piperidyl, for example 2- or 4-piperidyl. Heterocyclic-aliphatic radicals are lower alkyl or lower alkenyl radicals containing heterocyclic groups, especially those mentioned above. The above mentioned heterocyclyl radicals can be substituted, for example by optionally substituted aliphatic hydrocarbon radicals, especially lower alkyl, such as methyl, or, for example like the aliphatic hydrocarbon radicals, by functional groups.

Lower alkoxy is, for example, methoxy, ethoxy, n-propyloxy, isopropyloxy, n-butyloxy, isobutyloxy, sec.-butyloxy, tert.-butyloxy, n-pentyloxy or tert.-pentyloxy. These groups can be substituted, for example as in halogeno-lower alkoxy, especially 2-halogeno-lower alkoxy, for example 2,2,2-trichloroethoxy, 2-bromoethoxy or 2-iodoethoxy. Lower alkenyloxy is, for example, vinyloxy or allyloxy, lower alkylenedioxy is, for example, methylenedioxy, ethylenedioxy or isopropylidenedioxy, cycloalkoxy is, for example, cyclopentyloxy, cyclohexyloxy or adamantyloxy, phenyloxy, phenyl-lower alkoxy, for example benzyloxy or 1- or 2-phenylethoxy, or heterocyclyloxy or heterocyclyl-lower alkoxy, for example pyridyl-lower alkoxy, such as 2-pyridylmethoxy, furyl-lower alkoxy, such as furfuryloxy, or thienyl-lower alkoxy, such as 2-thenyloxy.

Lower alkylthio is, for example methylthio, ethylthio or n-butylthio, lower alkenylthio is, for example allylthio, and phenyl-lower alkylthio is, for example benzylthio, whilst mercapto groups etherified by heterocyclyl radicals or heterocyclyl-aliphatic radicals are, especially, imidazolylthio, for example 2-imidazolylthio, thiazolylthio, for example 2-thiazolylthio, 1,2,4- or 1,3,4-thiadiazolylthio, for example 1,2,4-thiadiazol-3-ylthio or 1,3,4-thiadiazol-2-ylthio, or tetrazolyl-thio, for example 1-methyl-5-tetrazolylthio.

Esterified hydroxyl groups are, above all, halogeno, for example fluoro, chloro, bromo or iodo, as well as lower alkanoyloxy, for example acetoxy, propionyloxy or pivaloyloxy.

Lower alkoxy-carbonyl is, for example, methoxycarbonyl, ethoxycarbonyl, n-propoxycarbonyl, isopropoxycarbonyl, tert.-butoxycarbonyl or tert.-pentoxycarbonyl.

N-lower alkyl-carbamoyl or N,N-di-lower alkyl-carbamoyl is, for example N-methylcarbamoyl, N-ethylcarbamoyl, N,N-dimethylcarbamoyl or N,N-diethylcarbamoyl, whilst N-lower alkylsulphamoyl for example represents N-methylsulphamoyl or N,N-dimethylsulphamoyl.

A carboxyl or sulpho group present in the alkali metal salt form is, for example, a carboxyl or sulpho group present in the sodium salt or potassium salt form.

Lower alkylamino or di-lower alkylamino is, for example, methylamino, ethylamino, dimethylamino or diethylamino, lower alkyleneamino is, for example, pyrrolidino or piperidino, oxa-lower alkyleneamino is, for example, morpholino, and aza-lower alkyleneamino is, for example, piperazino or 4-methylpiperazino. Acylamino especially represents carbamoylamino, lower alkylcarbamoylamino, such as methylcarbamoylamino, ureidocarbonylamino, guanidinocarbonylamino, lower alkanoylamino such as acetylamino or propionylamino, and also phthalimido, or sulphoamino which is optionally present in the salt form, such as the alkali metal, for example sodium, salt form or ammonium salt form.

Lower alkanoyl is, for example, acetyl or propionyl.

Lower alkenyloxycarbonyl is, for example, vinyloxycarbonyl, whilst cycloalkoxycarbonyl and phenyl-lower alkoxycarbonyl for example represents adamantyloxycarbonyl, benzyloxycarbonyl, diphenylmethoxycarbonyl or α-4-biphenylyl-α-methylethoxycarbonyl. Lower alkoxycarbonyl, wherein lower alkyl for example contains a monocyclic, monoazacyclic, monooxacyclic, or monothiacyclic group, is, for example, furyl-lower alkoxycarbonyl, such as furfuryloxycarbonyl, or thienyl-lower alkoxycarbonyl, for example 2-thenyloxycarbonyl.

Salts of compounds of the formula I are, in particular, acid addition salts of those compounds in which $R_1^a$ and $R_1^b$ represent hydrogen or together represent an ylidene group; suitable acids are, above all, inorganic acids, such as hydrogen halide acids, for example hydrochloric acid, hydrobromic acid, or hydriodic acid, sulphuric acid or phosphoric acids, as well as strong organic carboxylic acids or sulphonic acids.

The new disulphide compounds of the formula I represent, as is shown below, valuable intermediate products for the manufacture of pharmacologically active compounds.

Particularly valuable intermediate products are compounds of the formula I, wherein $R_1^a$ denotes hydrogen or the acyl group Ac' which represents an acyl radical contained in preferably pharmacologically active, naturally occurring or synthesisable N-acyl derivatives of 6-amino-penicillanic acid compounds or 7-amino-cephalosporanic acid compounds, or represents an easily removable acyl radical of a carbonic acid half-derivative, and $R_1^b$ represents hydrogen or wherein $R_1^a$ and $R_1^b$ together form an aliphatic ylidene, particularly a lower alkylidene group.

An acyl radical Ac' contained in pharmacologically active N-acyl derivatives of 6-amino-pencillanic acid or 7-amino-cephalosporanic acid, or an acyl radical which can be converted into these, is above all a group of the formula

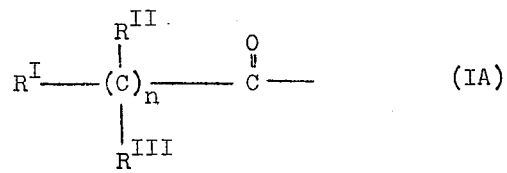

wherein n represents O and $R^I$ denotes hydrogen or an optionally substituted cycloaliphatic or aromatic hydrocarbon radical, or an optionally substituted heterocyclic radical, preferably of aromatic character, a functionally modified, preferably etherified hydroxyl or mercapto group or an optionally substituted amino group, or wherein n represents 1, and $R^I$ represents hydrogen or an optionally substituted, aliphatic, cycloaliphatic, cycloaliphatic-aliphatic, aromatic or araliphatic hydrocarbon radical or an optionally substituted heterocyclic or heterocyclic-aliphatic radical, wherein the heterocyclic radical preferably possesses aromatic character and/or a quaternary nitrogen atom, or represents an optionally functionally modified, preferably etherified or esterified, hydroxyl or mercapto group, an optionally functionally modified carboxyl group, an acyl group, an optionally substituted amino group or an azido group, and each of the radicals $R^{II}$ and $R^{III}$ is hydrogen, or wherein n represents 1, $R^I$ represents an optionally substituted aliphatic, cycloaliphatic, cycloaliphatic-aliphatic, aromatic or araliphatic hydrocarbon radical or an optionally substituted heterocyclic or heterocyclic-aliphatic radical, wherein the heterocyclic radical preferably displays aromatic character, $R^{II}$ denotes an optionally functionally modified, preferably etherified, hydroxyl or mercapto group, an optionally substituted amino group, an optionally functionally modified carboxyl or sulpho group, an azido group or a halogen atom, and $R^{III}$ represents hydrogen, or wherein n represents 1, each of the radicals $R^I$ and $R^{II}$ denotes a functionally modified, preferably etherified or esterified, hydroxyl group, or an optionally functionally modified carboxyl group, and $R^{III}$ represents hydrogen, or wherein n represents 1, $R^I$ denotes hydrogen or an optionally substituted aliphatic, cycloaliphatic, cycloaliphatic-aliphatic, aromatic or araliphatic hydrocarbon radical, and $R^{II}$ and $R^{III}$ together represent an optionally substituted aliphatic, cycloaliphatic, cycloaliphatic-aliphatic or araliphatic hydrocarbon radical bonded to the carbon atom by a double bond, or wherein n represents 1 and $R^I$ denotes an optionally substituted aliphatic, cycloaliphatic, cycloaliphatic-aliphatic, aromatic or araliphatic hydrocarbon radical or an optionally substituted heterocyclic or heterocyclic-aliphatic radical, wherein heterocyclic radicals preferably possess aromatic character, $R''$ denotes an optionally substituted aliphatic, cycloaliphatic, cycloaliphatic-aliphatic, aromatic or araliphatic hydrocarbon radical and $R'''$ denotes hydrogen or an optionally substituted aliphatic, cycloaliphatic, cycloaliphatic-aliphatic, aromatic or araliphatic hydrocarbon radical.

In the abovementioned acyl groups of the formula Ia, for example, n represents O and $R'$ represents hydrogen or a cycloalkyl group with 5–7 ring carbon atoms which is optionally substituted, preferably in the 1-position by amino or by a sulphoamino group which is optionally in the salt form, for example alkali metal salt form, a phenyl, naphthyl or tetrahydronaphthyl group which is optionally substituted, preferably by hydroxyl, lower alkoxy, for example methoxy, and/or halogeno, for example chloro, a heterocyclic group such as a 4-isoxazolyl group which is optionally substituted, for example by lower alkyl and/or phenyl groups, which can in turn carry substitutents, such as halogeno, for example chloro, or an amino group which is preferably N-substituted, for example by an optionally substituted lower alkyl radical, such as a lower alkyl radical containing halogeno, for example chloro, bromo or iodo, or n represents 1 and $R'$ represents a lower alkyl group which is optionally substituted, preferably by halogeno, e.g. chloro, optionally substituted phenyloxy, amino and/or carboxyl, a lower alkenyl group, a phenyl group which is optionally substituted, such as a phenyl group containing hydroxyl, halogeno, for example chloro, amino, aminomethyl and/or optionally substituted phenyloxy, a pyridyl, pyridinium, thienyl, 1-imidazolyl or 1-tetrazolyl group which is optionally substituted, for example by lower alkyl, e.g. methyl, amino or aminomethyl, an optionally substituted lower alkoxy group, a phenyloxy group which is optionally substituted, for example by hydroxyl and/or halogeno, such as chloro, a lower alkylthio or lower alkenylthio group, an optionally substituted, for example lower alkyl substituted, such as methyl-substituted, phenylthio, 2-imidazolylthio, 1,2,4-triazol-3-ylthio, 1,3,4-triazol-2-ylthio, 1,2,4-thiadiazol-3-ylthio, such as 5-methyl-1,2,4-thiadiazol-3-ylthio, 1,3,4-thiadiazol-2-ylthio, such as 5-methyl-1,3,4-thiadiazol-2-ylthio, or 5-tetrazolylthio, such as 1-methyl-5-tetrazolylthio group, a halogen atom, especially chlorine or bromine atom, an optionally functionally modified carboxyl group, such as a lower alkoxycarbonyl group, a cyano group, or a carbamoyl group which is optionally N-substituted, for example by phenyl, an optionally substituted lower alkanoyl or benzoyl group, or an azido group, and $R''$ and $R'''$ represent hydrogen, or n represents 1, $R'$ represents a phenyl or thienyl group which is optionally substituted, for example by hydroxyl and/or halogeno, for example chloro, and also represents a 1,4-cyclohexadienyl group, $R''$ represents an optionally substituted amino group, for example optionally substituted carbamoylamino group such as a guanidinocarbonylamino group, or a sulphoamino group optionally present in salt form, for example alkali metal salt form, an azido group, a carboxyl group optionally present in salt form, for example alkali metal salt form, or in the esterified form, for example, as a lower alkoxycarbonyl group, a cyano group, a sulpho group, an optionally substituted lower alkoxy or phenyloxy group, or a halogen atom, and $R'''$ represents hydrogen, or n represents 1, $R'$ and $R''$ each represent halogeno, for example bromo, or lower alkoxycarbonyl, for example methoxycarbonyl, and $R'''$ represents hydrogen, or n represents 1, and each of the groups $R'$, $R''$ and $R'''$ represent lower alkyl, for example methyl.

Such acyl radicals Ac' are, for example, formyl, cyclopentylcarbonyl, α-aminocyclopentylcarbonyl or α-aminocyclohexylcarbonyl (with an optionally substituted amino group, for example a sulphoamino group optionally present in the salt form, or an amino group substituted by an acyl radical which can preferably be split off easily, for example on treatment with an acid agent, such as trifluoroacetic acid, or with a chemical reducing agent, such as zinc in the presence of aqueous acetic acid, or by an acyl radical which can be converted into such a radical, preferably a suitable acyl radical of a carbonic acid half-ester, such as 2,2,2-trichloroethyloxycarbonyl, 2-bromoethoxycarbonyl, 2-iodoethoxycarbonyl, tert.-butoxycarbonyl or phenacyloxycarbonyl, or of a carbonic acid half-amide, such as carbamoyl or N-methylcarbamoyl), 2,6-dimethoxybenzoyl, tetrahydronaphthoyl, 2-methoxynaphthoyl, 2-ethoxy-naphthoyl, benzyloxycarbonyl, hexahydrobenzyloxycarbonyl, 5-methyl-3-phenyl-4-isoxazolyl-carbonyl, 3-(2-chlorophenyl)-5-methyl-4-isoxazolylcarbonyl, 3-(2,6-dichlorophenyl)-5-methyl-4-isoxazolylcarbonyl, 2-chloroethylaminocarbonyl, acetyl, propionyl, butyryl, hexanoyl, octanoyl, acrylyl, crotonoyl, 3-butenoyl, 2-pentenoyl, methoxyacetyl, methylthioacetyl, butylthioacetyl, allylthioacetyl, chloroacetyl, bromoacetyl, dibromoacetyl, 3-chloropropionyl, 3-bromopropionyl, aminoacetyl or 5-amino-5-carboxylvaleryl (with an amino group which is optionally substituted, for example as indicated, and/or a carboxyl group which is optionally functionally modified, and is, for example, in the salt form, such as the sodium salt form, or in the ester form, such as a lower alkyl ester form, for example methyl or ethyl ester form), azidoacetyl, carboxyacetyl, methoxycarbonylacetyl, ethoxycarbonylacetyl, bis-methoxycarbonylacetyl, N-phenylcarbamoylacetyl, cyanoacetyl, α-cyanopropionyl, 2-cyano-3,3-dimethylacrylyl, phenylacetyl, α-bromophenylacetyl, α-azidophenylacetyl, 3-chlorophenylacetyl, 4-aminomethylphenylacetyl, (with an amino group which is optionally substituted, for example as indicated), phenacylcarbonyl, phenyloxyacetyl, 4-trifluoromethylphenyloxyacetyl, benzyloxyacetyl, phenylthioacetyl, bromophenylthioacetyl, 2-phenyloxypropionyl, α-phenyloxyphenylacetyl, α-methoxyphenylacetyl, α-ethoxyphenylacetyl, α-methoxy-3,4-dichlorophenylacetyl, α-cyanophenylacetyl, phenylglycyl, 4-hydroxyphenylglycyl, 3-chloro-4-hydroxyphenylglycyl or 3,5-dichloro-4-hydroxyphenylglycyl (with an amino group which is optionally substituted, for example as indicated above), benzylthioacetyl, benzylthiopropionyl, α-carboxyphenylacetyl (with a carboxyl group which is optionally functionally modified, for example as indicated above), 3-phenylpropionyl, 3-(3-cyanophenyl)propionyl, 4-(3-methoxyphenyl)-butyryl, 2-pyridylacetyl, 4-aminopyridiniumacetyl (optionally with an amino group which is substituted, for example as indicated above), 2-thienylacetyl, 2-tetrahydrothienylacetyl, α-carboxy-2-thienylacetyl or α-carboxy-3-thienylacetyl (optionally with a carboxyl group which is functionally modified, for example as indicated above) α-cyano-2-thienylacetyl, α-amino-2-thienylacetyl or α-amino-3-thienylacetyl (optionally with an amino group which is substituted, for example as indicated above), α-sulphophenylacetyl (optionally with a sulpho group which is functionally modified, for example like the carboxyl group) 3-thienylacetyl, 2-furylacetyl, 1-imidazolylacetyl, 1-tetrazolylacetyl, 3-methyl-2-imidazolylthioacetyl, 1,2,4-triazol-3-ylthio-acetyl, 1,3,4-triazol-2-ylthioacetyl, 5-methyl-1,2,4-thiadiazol-3-ylthioacetyl, 5-methyl-1,3,4-thiadiazol-2-ylthioacetyl or 1-methyl-5-tetrazolylthioacetyl.

An easily removable acyl radical Ac', especially of a carbonic acid half-ester, is above all an acyl radical of a half-ester of carbonic acid which can be split off by reduction, for example by treatment with a chemical reducing agent, or by treatment with acid, for example with trifluoroacetic acid, such as a lower alkoxycarbonyl radical which preferably shows multiple branching in the α-position or is substituted by acylcarbonyl, especially benzoyl radicals, or substituted by halogen atoms in the β-position, for example tert.-butoxycarbonyl, tert.-pentoxycarbonyl, phenacyloxy carbonyl, 2,2,2-trichloroethoxycarbonyl or 2-iodoethoxycarbonyl or a radical which can be converted into the latter, such as 2-chloroethoxycarbonyl or 2-bromoethoxycarbonyl, and also preferably polycyclic cycloalkoxycarbonyl, for example adamantyloxycarbonyl, optionally substituted phenyl-lower alkoxycarbonyl, above all α-phenyl-lower alkoxycarbonyl, wherein the α-position preferably has several substituents, for example diphenylmethoxycarbonyl or α-4-biphenylyl-α-methylethoxycarbonyl, or furyl-lower alkoxycarbonyl, above all α-furyl-lower alkoxycarbonyl, for example furfuryloxycarbonyl.

A divalent acyl group formed by the two radicals $R_1^a$ and $R_1^b$ is, for example, the acyl radical of a lower alkanedicarboxylic acid or lower alkenedicarboxylic acid, such as succinyl, or of an o-aryldicarboxylic acid, such as phthaloyl.

A further divalent radical formed by the groups $R_1^a$ and $R_1^b$ is, for example, a 1,1-di-lower alkyl-4-oxo-2-aza-1,4-butylene radical which, especially in the 3-position, contains, for example, an optionally substituted phenyl or thienyl, for example, 1,1-dimethyl-3-phenyl-4-oxo-2-aza-1,4-butylene radical.

Above all, $R_1^a$ in a compound of the formula I represents hydrogen or an acyl radical contained in naturally occurring or biosynthetically preparable N-acyl derivatives of 6-amino-penam-3-carboxylic acid compounds or 7-amino-ceph-3-em-4-carboxylic acid compounds, such as an optionally substituted phenylacetyl or phenyloxyacetyl radical, and also an optionally substituted lower alkanoyl or lower alkenoyl radical, for example 4-hydroxy-phenylacetyl, hexanoyl, octanoyl, 3-hexenoyl, 5-amino-5-carboxy-valeryl, n-butylthioacetyl or allylthioacetyl, and especially phenylacetyl or phenyloxyacetyl, an acyl radical occurring in highly active N-acyl derivatives of 6-amino-penam-3-carboxylic acid compounds or 7-amino-ceph-3-em-4-carboxylic acid compounds, such as formyl, 2-chloroethylcarbamoyl, cyanoacetyl, an acyl residue of the formula

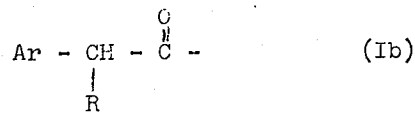

in which Ar is phenyl, 3- or 4-hydroxy-phenyl, 3-chloro-4-hydroxy-phenyl, 3,5-dichloro-4-hydroxy-phenyl or 2-thienyl and R stands for hydrogen or amino, carboxy or sulfo, preferably protected as indicated above, for example as acylamino or esterified carboxy or sulfo, e.g. tert.-butyloxycarbonylamino, 2,2,2-trichloroethoxycarbonylamino, 2-bromoethoxycarbonylamino or 2-iodoethoxycarbonylamino, furthermore diphenylmethoxycarbonyl, or an acyl radical which can be split off easily, for example on treatment with an acid agent, such as trifluoroacetic acid, or with a chemical reducing agent, such as zinc in the presence of aqueous acetic acid, or an acyl radical which can be converted into such an acyl radical, preferably a suitable acyl radical of a carbonic acid half-ester, such as tert.-butoxycarbonyl, phenacyl-carbonyl, 2,2,2-trichloroethoxycarbonyl or 2-iodoethoxycarbonyl, or 2-bromoethoxycarbonyl, which can be converted into the latter, and $R_1^b$ represents hydrogen, or $R_1^a$ and $R_1^b$ together form a lower alkylidene, particularly the isopropylidene or isobutylidene group.

The disulphide compounds of the formula I can be obtained in a surprising manner if a compound of the formula

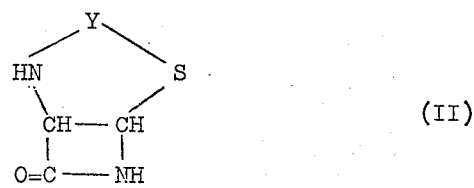

wherein Y represents an ylidene residue, is oxidised and, if desired, in a resulting compound of the formula I, wherein $R_1^a$ and $R_1^b$ together represent an ylidene residue, this group is split off, and/or, if desired, in a resulting compound of the formula I, wherein $R_1^a$ and $R_1^b$ represent hydrogen or $R_1^a$ and $R_1^b$ together represent an ylidene group, an amino protective group is introduced into the amino group which optionally contains such an ylidene radical, and/or, if desired, a resulting salt is converted into the free compound or into another salt and/or a free compound is converted into a salt and/or, if desired, a resulting isomer mixture is separated into the individual isomers.

In a starting material of the formula II, an ylidene residue Y represents an optionally substituted, preferably a monosubstituted or disubstituted methylene group, wherein substituents are preferably optionally substituted, monovalent or divalent hydrocarbon radicals, above all appropriate aliphatic hydrocarbon radicals, such as lower alkyl groups, for example methyl, ethyl, n-propyl, isopropyl, n-butyl, or isobutyl groups, and also lower alkylene groups, for example 1,4-butylene or 1,5-pentylene groups, as well as appropriate cycloaliphatic, cycloaliphatic-aliphatic, aromatic or araliphatic hydrocarbon radicals, such as cycloalkyl groups, for example cyclopentyl or cyclohexyl groups, phenyl groups or phenyl-lower alkyl groups, for example benzyl or phenylethyl groups. Above all, Y represents the isopropylidene or the isobutylidene group, that is to say represents a methylene radical substituted by two methyl groups or isopropyl group.

Oxidising agents used according to the process are above all those which are used to form disulphide compounds under conditions under which the β-lactam ring is not affected. These are, in particular, halogen, such as bromine and above all iodine, which is advantageously used in the presence of organic solvents, for example optionally substituted hydrocarbons, such as aromatic hydrocarbons, for example benzene, halogenated aliphatic hydrocarbons, e.g. methylene chloride, ethers, such as cyclic ethers, for example tetrahydrofurane or dioxane, alcohols, such as lower alkanols, for example methanol or ethanol, or carboxylic acids, such as lower alkanecarboxylic acids, for example acetic acid, or solvent mixtures, and optionally in the presence of water, with cooling (for example at temperatures down to about 30 C), at room temperature or with slight warming (for example to about +80°C), and also, if necessary, under an inert gas atmosphere, such as a nitrogen atmosphere.

Further oxidising agents suitable for the oxidation of starting materials are oxidising heavy metal carboxylates, preferably lead-IV carboxylates, such as lead-IV alkanoates, especially lead-IV lower alkanoates and above all lead tetraacetate, also lead tetrapropionate or lead tetrastearate, as well as optionally substituted lead tetrabenzoates, for example lead tetrabenzoate or lead tetra-3-bromobenzoate, as well as thallium-III carboxylates, for example thallium-III acetate, or mercury-II carboxylates, such as mercury-II acetate, it being possible to form these oxidising agents, if desired, in situ, for example by reaction of lead dioxide or mercury-II oxide with an organic carboxylic acid, such as acetic acid.

Advantageously, the above heavy metal carboxylates, especially the appropriate lead-IV compounds, are used in the presence of a light source, it being preferred to employ ultraviolet light, as well as light of longer wavelengths, such as visible light, if appropriate with the addition of suitable sensitisers. The UV-light preferably has a main wavelength range of above 280 m$\mu$, above all of about 300 m$\mu$ to about 350 m$\mu$; this can be achieved, for example, by suitable filtration of the ultra-violet light through an appropriate filter, for example a Pyrex filter, or through suitable solutions, such as salt solutions, or through other liquids which absorb light of shorter wavelengths, such as benzene or toluene. The ultra-violet light is preferably generated by means of high pressure mercury vapour lamp.

The oxidation with a heavy metal carboxylate oxidising agent is usually carried out in the presence of a suitable diluent, such as optionally substituted hydrocarbons, for example, aromatic hydrocarbons, e.g. benzene, or optionally functionally modified organic carboxylic acids, e.g. acetonitrile or acetic acid, if necessary with cooling or with warming, and/or in an inert gas atmosphere.

Further oxidising agents which can be used in the above reaction are oxygen (for example as pure oxygen or in the form of air) in the presence of a heavy metal salt, for example copper-II or iron-III salt, employed as the catalyst, such as iron-III chloride or iron-III sulphate, and preferably in the presence of a solvent, such as acetic acid, hypohalite compounds, especially alkali metal hypohalites, for example sodium hypoiodite, as well as organic hypohalites, such as tert.-butyl hypochlorite, suitable iron-III salts and complexes, such as iron-III chloride, preferably in the presence of an organic solvent, such as an ether for example, diethyl ether, a carboxylic acid, e.g. acetic acid, or an alcohol, for example, a lower alkanol, e.g. ethanol, and optionally in the presence of water, or potassium ferricyanide or 1,2-diiodoethane in the presence of an organic solvent, for example a lower alkanone, e.g. acetone, an ether, e.g. tetrahydrofurane, or a lower alkanol, e.g. ethanol, or thiocyanogen in the presence of a suitable organic solvent, for example an organic carboxylic acid, e.g. acetic acid.

In a disulphide compound obtainable according to the process, in which the amino group is substituted by an ylidene, i.e., an optionally monosubstituted or disubstituted methylene group, this group can be replaced by hydrogen in the presence of water, that is to say thus also during the oxidation reaction if this is carried out in the presence of water.

In a disulphide compound obtainable according to the process, in which the amino group is unsubstituted or contains an ylidene radical as substituent, an amino protective group can be introduced into such group according to methods which are in themselves known, an acyl group Ac for example being introduced by treatment with carboxylic acids or reactive acid derivatives thereof, such as halides, for example chlorides, anhydrides (by which there are also to be understood the internal anhydrides of carboxylic acids, that is to say ketenes, or of carbamic or thiocarbamic acids, that is to say isocyanates or isothiocyanates, or mixed anhydrides, such as those can be formed, for example, with chloroformic acid lower alkyl esters or trichloroacetic acid chloride) or activated esters. The process is carried out, if necessary, in the presence of suitable condensation agents, for example in the presence of carbodimides, such as dicyclohexylcarbodiimide, if acids are used, and for example in the presence of basic agents, such as triethylamine or pyridine, if reactive acid derivatives are used.

An acyl group can also be introduced in stages; for example it is possible to introduce a halogeno-lower alkanoyl group, for example bromoacetyl group, into an amino group of a compound of the formula I, in which $R_1^a$ and $R_1^b$ represent hydrogen, and to react a resulting N-halogeno-lower alkanoylamino compound with suitable exchange reagents, such as basic compounds, for example tetrazole, thio compounds, for example 2-mercapto-1-methyl-imidazole, or metal salts, for example sodium azide, and thus to obtain substituted N-lower alkanoylamino compounds. It is furthermore possible to react a compound obtainable according to the process with a carbonyl dihalide, such as phosgene, and to treat the halogenocarbonylamino compound formed, for example chlorocarbonylamino compound, with an alcohol, for example tert.-butanol, and thus to introduce an etherified hydroxycarbonyl group, for example the tert.-butoxycarbonyl group, in stages into the amino group.

A triarylmethyl group, for example trityl group, can for example be introduced by treatment with a reactive ester of a triarylmethanol, such as a trityl halide, for example trityl chloride, preferably in the presence of a basic agent, such as pyridine.

In both compounds participating in the substitution, free functional groups can transiently be protected in a manner which is in itself known during the substitution reaction, and be liberated after the substitution in a manner which is in itself known.

In the substitution reaction, or during the working up of the substitution product, an ylidene residue, formed by the groups $R_1^A$ and $R_1^b$, is split off, possibly in a modified form, particularly in the presence of water.

Salts of compounds of the formula I can be manufactured in a manner which is in itself known, acid addition salts for example by treatment with an acid or with a suitable anion exchange reagent. Salts can be converted into the free compounds in the usual manner, acid addition salts for example by treatment with a suitable basic agent.

Resulting mixtures of isomers can be separated into the individual isomers according to methods which are in themselves known, for example by fractional crystallisation, adsorption chromatography (column chromatography or thin layer chromatography) or other suitable separation processes. Resulting racemates can be separated into the antipodes in the usual manner, optionally after the temporary introduction of salt-forming groupings, for example by forming a mixture of diastereoisomeric salts with optically active salt-forming agents, separating the mixture into the diastereoisomeric salts and converting the separated salts into the free compounds, or by fractional crystallisation from optically active solvents.

The process also includes those embodiments according to which compounds formed as intermediate products are used as starting materials and the remaining process steps are carried out on these, or the process is stopped at any stage; furthermore, starting materials can be used in the form of derivatives or can be formed during the reaction.

Preferably, those starting substances are used, and the reaction conditions are so chosen, that the compounds initially listed as being particularly preferred are obtained.

The starting substances of the formula II used according to the process, wherein Y represents a disubstituted methylene group, are known (see, for example, Austrian Pat. No. 264,533) or can be manufactured according to the processes used for the known compounds. Starting substances, wherein Y denotes an unsubstituted or monosubstituted methylene group can, for example, be obtained if a compound of the formula II, wherein Y represents a disubstituted methylene group, is reacted with an aldehyde or a reactive derivative, such as a hydrate or a reactive polymeric product, of such an aldehyde. This reaction is usually carried out in a solvent, such as an organic solvent which is miscible with water, such as an alcohol or ether which is miscible with water, for example dioxane, or in a suitable mixture of solvents. Preferably, water is added and the process is carried out in the presence of an acid agent, such as an inorganic or organic acid, for example an organic carboxylic acid or preferably sulphonic acid, such as p-toluenesulphonic acid, if desired or required with cooling or preferably with warming and/or in a closed vessel and/or in an inert gas atmosphere, for example under nitrogen.

The starting substance of the formula II, wherein Y represents a methylene radical substituted by the isopropyl group, can be manufactured from easily accessible starting substances, if a penam-3-carboxylic acid compound IIIa of the formula

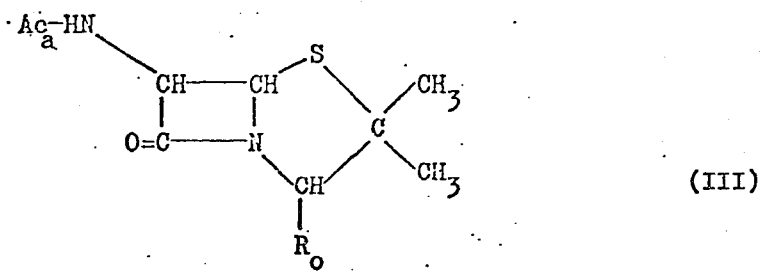

(III)

in which $Ac_a$ represents the acyl radical of an organic carboxylic acid, wherein free functional groups, such as hydroxyl, mercapto and especially amino and carboxyl groups are optionally protected, for example by acyl groups or in the form of ester groups, respectively, and $R_o$ represents a carboxyl group —C(=O)—OH (compound IIIa) or a salt thereof, is converted into the corresponding acid azide compound of the formula III, wherein $R_o$ represents the azido carbonyl radical —C(=O)—N$_3$ (compound IIIb), this is converted, with elimination of nitrogen, to the corresponding isocyanate compound of the formula III, wherein $R_o$ denotes the isocyanato group -N=C=O (compound IIIc), and the latter is simultaneously or subsequently reacted with a compound of the formula H-X$_1$ (IV), wherein X$_1$ together with the carbonyl group in the isocyanato grouping represents an esterified carboxyl group which can be split under neutral or acid conditions, and in a resulting compound, if required or desired, an acyl radical $Ac_a$ is replaced by hydrogen, and, if desired, this hydrogen is replaced by an acyl group which can be split off in the subsequent step.

In the penam compound of the formula

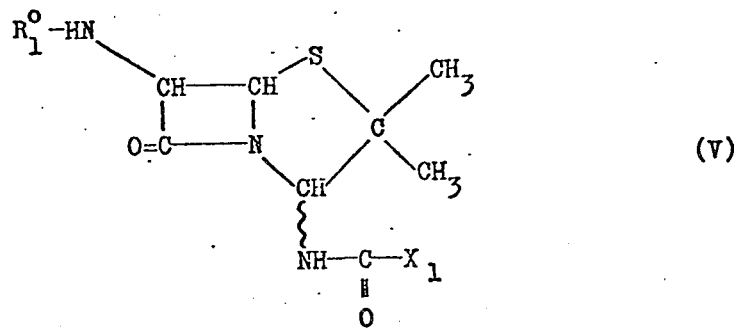

(V)

thus obtainable, wherein $R_1^o$ represents hydrogen or an acyl group $Ac^o$ which can be split off under the reaction conditions of the subsequent process step, the group of the formula —C(=O)—X$_1$ is split under neutral or weakly acid conditions, with simultaneous or subsequent treatment with water, and the 4,4-dimethyl-5-thia-2,7-diaza-bicyclo[4.2.0]oct-2-en-8-one which may be formed is separated off, or the carbon-nitrogen double bond therein is reduced.

An acyl group $Ac_n$ occurring in the compounds of the formula III can represent any acyl radical of an organic carboxylic acid with optionally protected functional groups, but above all an acyl radical contained in naturally occurring or biosynthetically preparable N-acyl derivatives of 6-amino-penam-3-carboxylic acid compounds, such as a monocyclic arylacetyl or aryloxyacetyl radical, and also an optionally substituted lower alkanoyl or lower alkenoyl radical, for example the 4-hydroxyphenylacetyl, hexanoyl, octanoyl, 3-hexenoyl, 5-amino-5-carboxyvaleroyl, n-butylthioacetyl or allylthioacetyl radical, especially the phenylacetyl or phenyloxyacetyl radical, or an acyl radical which can be removed easily, preferably under acid conditions, such as the acyl radical of a half-ester of carbonic acid, for example the tert.-butoxycarbonyl radical.

The conversion of an acid compound IIIa or of a suitable salt, especially an ammonium salt, into the corresponding acid azide IIIb can, for example, be effected by conversion into a mixed anhydride (for example by treatment with a halogenoformic acid lower alkyl ester, such as chloroformic acid ethyl ester, in the presence of a basic agent, such as triethylamine) and treatment of such an anhydride with an alkali metal azide, such as sodium azide, or an ammonium azide, for example benzyltrimethylammonium azide. The acid azide compound IIIb thus obtainable can be converted into the desired isocyanate compound IIIb in the absence or presence of a compound of the formula IV under the reaction conditions, for example during warming, and the isocyanate compound IIIc usually does not have to be isolated and can be directly converted, in the presence of a compound of the formula IV, into the desired compound of the formula V.

Etherified hydroxyl groups $X_1$ are above all etherified hydroxyl groups, which together with the carbonyl grouping form an esterified carboxyl group which can be split under neutral or weakly acid conditions.

The group $X_1$ represents, for example, the radical of the formula $-O-R_o^a$, which together with the carbonyl grouping represents an esterified carboxyl group which can easily be split on treatment with chemical reducing agents under neutral or weakly acid conditions. In this group, $R_o^a$ denotes a 2-halogeno-lower alkyl radical, in which halogen preferably has an atomic weight of above 19, especially a 2-polychloro-lower alkyl radical, such as a 2-polychloroethyl radical, above all the 2,2,2-trichloroethyl radical, as well as the 2,2,2-trichloro-1-methylethyl radical, but can also denote, for example, a 2-bromo-lower alkyl radical, such as a 2-polybromo-lower alkyl radical, such as the 2,2,2-bromoethyl radical, furthermore the 2-bromo-ethyl radical, or a 2-iodo-lower alkyl radical, for example especially the 2-iodoethyl radical.

A further group $X_1$ which together with the carbonyl grouping represents an esterified carboxyl group which can easily be split on treatment with chemical reducing agents under neutral or weakly acid conditions is the group $-O-R_o^b$, wherein $R_o^b$ represents an arylcarbonylmethyl group and preferably the unsubstituted phenacyl radical, as well as a phenacyl radical which is substituted in the aromatic part, such as substituted by lower alkyl or lower alkoxy groups or halogen atoms.

The group $X_1$ can also represent the radical of the formula $-O-R_o^c$, which together with the carbonyl grouping represents an esterified carboxyl group which can easily be split on irradiation under neutral or weakly acid conditions. In this group, $R_o^c$ represents an arylmethyl group, wherein aryl denotes an optionally substituted phenyl group, of which the substituents are above all functional groups, such as free or functionally modified carboxyl groups, for example carboxyl, lower alkoxycarbonyl, carbamoyl or cyano groups, optionally substituted amino groups, such as di-lower alkylamino groups, or acyl groups, such as lower alkanoyl groups, but especially optionally functionally modified, especially esterified, hydroxyl or mercapto groups, such as acyloxy groups, for example lower alkanoyloxy groups, or halogen atoms, and above all etherified hydroxyl or mercapto groups, such as lower alkoxy groups as well as lower alkylthio groups (which in the preferred phenyl radical above all occupy the 3-, 4- and/or 5-position) and/or above all nitro groups (in the preferred phenyl radical, preferably in the 2-position). Such groups $R_o^c$ are especially 1-phenylethyl or benzhydryl, above all benzyl, radicals, which are substituted by the lower alkoxy groups, such as methoxy groups, preferably in the 3-, 4- and/or 5-position, and/or by nitro groups, preferably in the 2-position, especially the 3- or 4-methoxybenzyl, 3,5-dimethoxy-benzyl, 2-nitrobenzyl or 4,5-dimethoxy-2-nitro-benzyl radical.

A group $X_1$ can also represent the radical of the formula $-O-R_o^d$, which together with the carbonyl grouping forms an esterified carboxyl group which can easily be split under acid conditions. Such a radical $R_o^d$ is above all a methyl group, which is monosubstituted by a carbocyclic aryl group possessing electron-donating substituents, or by a heterocyclic group of aromatic character possessing oxygen or sulphur atoms as ring members, or denotes, in an oxacycloaliphatic or thiacycloaliphatic radical, the ring member which forms the α-position relative to the oxygen atom or sulphur atom.

A carbocyclic aryl group containing electron-donating substituents in the aryl radical is above all the phenyl radical wherein suitable substituents, which are preferably located in the p- and/or o-position of the phenyl radical, are, for example, free or preferably functionally modified, such as esterified and above all etherified, hydroxyl groups, such as lower alkoxy groups, as well as corresponding free or functionally modified mercapto groups, and also aliphatic, cycloaliphatic, aromatic or araliphatic, optionally suitably substituted, hydrocarbon radicals, especially lower alkyl groups, or aryl groups, for example phenyl groups.

A heterocyclic group of aromatic character containing oxygen or sulphur atoms as ring members is above all a furyl radical, for example 2-furyl radical, or a thienyl radical, for example 2-thienyl radical.

An oxacycloaliphatic and thiacycloaliphatic radical linked in the α-position is above all a 2-oxyacycloalkyl or 2-thiacycloalkyl group as well as a 2-oxacycloalkenyl or 2-thiacycloalkenyl group, in which the methyl group $R_o^d$ represents the ring member adjacent to the ring oxygen atom or ring sulphur atom, and which preferably contains 4–6 ring carbon atoms, above all a 2-tetrahydrofuryl, 2-tetrahydropyranyl or 2,3-dihydro-2-pyranyl radical or a corresponding sulphur analogue.

Preferred radicals $R_o^d$ are 4-methoxybenzyl and 3,4-dimethoxybenzyl radicals, as well as 2-tetrahydrofuryl, 2-tetrahydropyranyl or 2,3-dihydro-2-pyranyl groups.

The reaction of a compound of the formula IIIc with a compound of the formula IV, especially with a 2-halogenoethanol $R_o^a$-OH, for example with 2,2,2- trichloroethanol or 2-bromoethanol, with an arylcarbonylmethanol $R_o^b$-OH, for example phenacyl alcohol, or with an arylmethanol $R_o^c$-OH or $R_o^d$-OH, for example 4,5-dimethoxy-2-nitro-benzylalcohol or 4-methoxybenzyl alcohol, is carried out optionally in an inert solvent, for example in a halogenated hydrocarbon, such as carbon tetrachloride, chloroform or methylene chloride, or in an aromatic solvent, such as benzene, toluene or chlorobenzene, preferably with warming.

An acyl group $Ac^o$ which can be split off under the reaction conditions of the conversion of a compound of the formula V into the starting material of the formula II, wherein Y represents an 1-isobutylidene group, is, for example, a group of the formula $—C(=O)—X_1$, wherein $X_1$ has the abovementioned meaning, especially a group of the formula $—C(=O)—O—R_o^a$, $—C(=O)—O—R_o^b$, $—C(=O)—O—R_o^c$ or $—C(=O)—O—R_o^d$, wherein $R_o^a$, $R_o^b$, $R_o^c$ and $R_o^d$ have the abovementioned meanings, but can also represent any other acyl group which can be split off under the reaction conditions mentioned, especially a grouping $R_o^e—O—C(=O)—$ which can be split off under acid conditions, wherein $R_o^e$ preferably is a methyl radical with several substituents in the α-position, such as a lower alkyl group with several branches in the α-position, for example a tert.-butyl or tert.-pentyl group, a cycloalkyl group, for example adamantyl group, a polyarylmethyl group, for example benzhydryl or trityl group, or a 2-(4-biphenylyl)-1-methyl-ethyl group. The abovementioned $R_o^e—O—C(=O)—$ groupings can, in particular, be removed, that is to say replaced by hydrogen, in the presence of oxygen-containing acids, above all in the presence of strong organic carboxylic acids, such as trifluoroacetic acid, as well as formic acid, or of strong organic sulphonic acids, such as p-toluenesulphonic acid.

An acyl group $Ac_a$ which can not be removed under the reaction conditions of the subsequent process step, especially an acyl group which differs from the radical of the formula $—C(=O)—X_1$, can be removed in a manner which is in itself known if desired, after protection of functional groups in such a radical (for example by acylation, esterification or silylation) for example by treatment with a suitable inorganic acid halide, such as phosphorus pentachloride, preferably in the presence of a basic agent, such as pyridine, to form an imidehalide, reaction of the imide-halide with an alcohol, such as a lower alkanol, for example methanol, and splitting of the imino ether, for example in an aqueous medium, preferably under acid conditions. The acyl radical of a suitable half-ester of carbonic acid, such as a carbo-lower alkoxy radical which can be split under acid conditions, for example the carbo-tert.-butoxy radical or carbo-tert.-pentyloxy, carboadamantyloxy or carbodiphenylmethoxy radical, can for example be removed by treatment with trifluoroacetic acid.

The splitting of the group $—C(=O)—X_1$ in an intermediate product of the formula V depends on the nature of this group, the splitting being carried out in the presence of at least one mol of water, and normally an excess of water, or the reaction product subsequently being treated with water.

The splitting of an esterified carboxyl group of the formula $—C(=O)—X_1$, which in a compound of the formula V can also represent the radical $Ac^o$, and wherein $X_1$ represents the group $—O—R_o^a$ or $—O—R_o^b$, is effected by treatment with a chemical reducing agent in the presence of at least an equimolar amount of water, and usually in the presence of an excess of water. The process is carried out under mild conditions, in most cases at room temperature or even with cooling.

Chemical reducing agents are, for example, suitable reducing metals, as well as reducing metal compounds, for example metal alloys or metal amalgams, as well as strongly reducing metal salts. Zinc, zinc alloys, for example zinc-copper, or zinc amalgam, as well as magnesium, are particularly suitable, and these are preferably employed in the presence of hydrogen-donating agents which together with the metals, metal alloys and metal amalgams can generate nascent hydrogen, zinc, for example, advantageously in the presence of acids, such as organic carboxylic acids, for example lower alkanecarboxylic acids, above all acetic acid, or acid agents, such as ammonium chloride or pyridine hydrochloride, preferably with the addition of water, or in the presence of alcohols, especially aqueous alcohols, such as lower alkanols, for example methanol, ethanol or isopropanol, which can optionally be used together with an organic carboxylic acid, and alkali metal amalgams, such as sodium amalgam or potassium amalgam, or aluminium amalgam, in the presence of moist solvents, such as ethers or lower alkanols.

Strongly reducing metal salts are, above all, chromium-II compounds, for example chromium-II chloride or chromium-II acetate, which are preferably used in the presence of aqueous media, containing water-miscible, organic solvents, such as lower alkanols, carboxylic acids, such as lower alkanecarboxylic acids or derivatives, such as optionally substituted, for example lower-alkylated, amides thereof, or ethers, for example methanol, ethanol, acetic acid, dimethylformamide, tetrahydrofurane, dioxane, ethylene glycol dimethyl ether or diethylene glycol dimethyl ether.

In a compound of the formula V, wherein $X_1$ represents a radical of the formula $—O—R_o^c$, the group of the formula $—C(=O)—X_1$, which can also represent the group $Ac^o$, can be split by irradation with light, preferably with ultra-violet light. Herein, light of longer or shorter wavelengths is used depending on the nature of the substituent $R_o^c$. Thus, for example, groups of the formula $—C(=O)—O—R_o^c$, wherein $R_o^c$ represent an arylmethyl radical, especially benzyl radical, which is substituted by a nitro group in the 2-position of the aryl radical and optionally possesses further substituents, such as lower alkoxy groups, for example methoxy groups, for example represents the 4,5-dimethoxy-2-nitro-benzyl radical, are split by irradation with ultra-violet light of wavelength range above 290 mµ, whilst those in which $R_o^c$ represents an arylmethyl radical, for example benzyl radical, which is optionally substituted in the 3-, 4- and/or 5-position, for example by lower alkoxy groups and/or nitro groups, is split by irradiation with ultra-violet light of a wavelength range of below 290 mµ. In the former case, the process is carried out with a high pressure mercury vapour lamp, preferably using pyrex glass as the filter, for example at a main wavelength range of about 315 mµ, whilst in the latter case the process is carried out with a low pressure mercury vapour lamp, for example at a main wavelength range of about 254 mµ.

The irradiation reaction is carried out in the presence of a suitable polar of non-polar organic solvent or of a mixture; solvents are, for example, optionally halogenated hydrocarbons, such as optionally chlorinated lower alkanes, for example methylene chloride, or optionally chlorinated benzenes, for example benzene, and also alcohols, such as lower alkanols, for example methanol, or ketones, such as lower alkanones, for example acetone. The reaction is preferably carried out at room temperature, or, if necessary, with cooling, and usually in an inert gas atmosphere, for example a nitrogen atmosphere. The reaction is preferably carried out in the presence of water; however, it is also possible subsequently to treat the irradiation product with water, for example by effecting the working up of the resulting product in the presence of water.

In a compound of the formula V, wherein $X_1$ represents a group of the formula $-O-R_o{}^a$, the grouping of the formula $-C(=O)-O-R_o{}^a$, which can also represent the group $Ac^o$, can be split by treatment with an acid agent, especially with an acid, such as a strong organic carboxylic acid, for example an optionally substituted lower alkanecarboxylic acid which preferably contains halogen atoms, such as acetic acid or trifluoroacetic acid, and also with formic acid or with a strong organic sulphonic acid, for example p-toluenesulphonic acid. Herein, an excess of an acid reagent which is liquid under the reaction conditions is usually employed as the diluent, and the process is carried out in the presence of at least an equivalent amount of water, at room temperature or with cooling, for example to between about −20°C and +10°C. If $Ac^o$ represents, in the starting material, a group of the formula $-C(=O)-O-R_o{}^c$, such a group can be split off simultaneously during the treatment with the acid agent.

The 4,4-dimethyl-5-thia-2,7-diazabicyclo[4.2.0]oct-2-en-8-one which may be formed as an intermediate product, and which in particular arises during the non-reductive splitting of a group of the formula $-C(=O)-X_1$ in a compound of the formula V, wherein $X_1$ represents the group of the formula $-O-R_o{}^c$ or $-O-R_o{}^d$, and also arises when splitting a group of the formula $-C(=O)-X_1$ in a compound of the formula V, wherein $X_1$ represents the group of the formula $-O-R_o{}^a$, with the aid of a strongly reducing metal salt, can be converted into the desired 3-isopropyl-4-thia-2,6-diazabicyclo[3.2.0]heptan-7-one by exhaustive reduction, or can be separated from a mixture with the latter. Chemical reducing agents, above all reducing metals or metal compounds, such as those mentioned above, preferably in the presence of hydrogen-releasing agents, especially zinc in the presence of an acid, such as acetic acid, or of an alcohol, are preferentially used for the reduction of the carbon-nitrogen double bond in 4,4-dimethyl-5-thia-2,7-diazabicyclo[4.2.0]oct-2-en-8-one, which takes place with simultaneous rearrangement to give 3-isopropyl-4-thia-2,6-diazabicyclo[3.2.0]heptan-7-one.

A mixture of 3-isopropyl-4-thia-2,6-diazabicyclo[3.2.0]heptan-7-one and of 4,4-dimethyl-5-thia-2,7-diazabicyclo[4.2.0]oct-2-en-8-one, such as arises, above all, during the reductive splitting of the group of the formula $-C(=O)-X_1$ in a starting material of the formula V, wherein $X_1$ denotes a group of the formula $-O-R_o{}^a$ or $-O-R_o{}^b$, can be separated according to methods of separation which are in themselves known, for example by fractional crystallisation, adsorption chromatography (column chromatography or thin layer chromatography) or other suitable separation processes, into the individual compounds.

In the manufacture of the starting substances of the formula II, intermediate products can, at suitable stages, be converted into one another. Thus, for example, an aliphatically bonded chlorine atom or especially bromine atom in the radical $X_1$, such as the 2-bromoethoxy radical, can be replaced by an iodine atom, for example by treatment with a suitable iodide salt, such as an alkali metal iodide, for example sodium iodide, in a suitable solvent, such as acetone, the 2-bromoethyl radical can be converted into the 2-iodoethyl radical.

Further it is possible, in a compound of the formula V wherein $R_1{}^o$ denotes hydrogen, to replace this hydrogen by an acyl group $Ac^o$ which can be split off under the reaction conditions and is replaceable by hydrogen, for example by means of acylation processes which are in themselves known.

The invention also embraces the new compounds of the formula I, in which $R_1{}^a$ represents hydrogen or an acyl residue of the formula Ib, in which Ar and R have the previously given meanings, and $R_1{}^b$ stands for hydrogen, or wherein $R_1{}^a$ and $R_1{}^b$ together form lower alkylidene, such as isopropylidene or isobutylidene, and especially those, in which $R_1{}^a$ is hydrogen, phenylacetyl, α-phenylgylcyl with optionally protected amino group, 2-thienylacetyl, α-amino-2-thienylacetyl with optionally protected amino group, α-carboxyphenylacetyl with optionally protected carboxyl group or α-carboxy-2-thienylacetyl with optionally protected carboxyl group, and $R_1{}^b$ is hydrogen, or salts of such compounds having salt-forming groups.

As has been mentioned, the compounds of the formula I represent valuable intermediate products which are in particular suitable for the manufacture of pharmacologically valuable compounds, for example of the type of 7β-amino-ceph-3-em-4-carboxylic acid and N-acyl derivatives thereof, especially the latter, which are active against micro-organisms, such as Gram-positive and Gram-negative bacteria.

Thus, it is possible to react a compound of the formula I, wherein $R_1{}^a$ represents an amino protective group $R_1{}^A$ and $R_1{}^b$ or $R_1{}^A$ and $R_1{}^b$ together have the above given meaning, with ethylene oxide (VI) with simultaneous treatment with a reducing agent; a compound of the formula

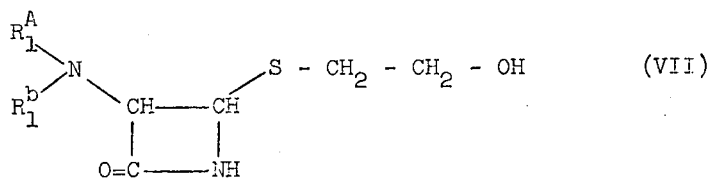

is thus obtained.

In a compound of the formula VII the hydroxyl group is converted into a hydroxyl group esterified by the acyl radical of the formula $-C(=O)-X_2$, in which $X_2$ represents an etherified hydroxyl group, which together with the carbonyl grouping forms an esterified carboxyl group which can be split under mild conditions.

The compound of the formula

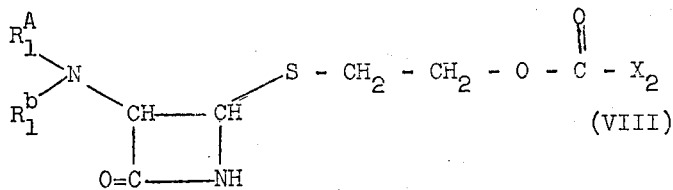

(VIII)

thus obtainable is reacted with a compound of the formula

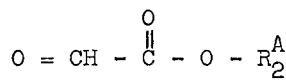   (IX)

wherein $R_2^A$ represents an organic radical, for example, of an alcohol or phenol compound, which together with the —C(=O)—O— grouping forms a protected, e.g. esterified carboxyl group, or with a reactive derivative thereof, and in the addition compound of the formula

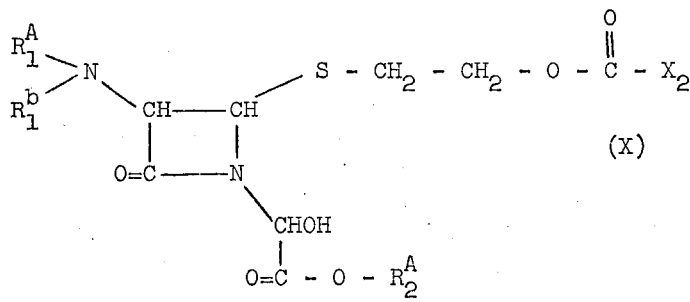

(X)

the secondary hydroxyl group is converted into a reactive esterified hydroxyl group. The reactive esterified ester of the formula wherein Z represents a reactive esterified hydroxyl group, above all a halogen atom, especially a chlorine or bromine atom, as well as an organic sulphonyloxy group, for example 4-methylphenylsulphonyloxy or methylsulphonyloxy group, is reacted with a phosphine compound of the formula

   (XII)

wherein each of the radicals $R_a$, $R_b$ and $R_c$ represents an optionally substituted hydrocarbon radical, and one thus obtains, if necessary after splitting off the elements of an acid of the formula H-Z (XIIIa) from a phosphonium salt compound of the formula

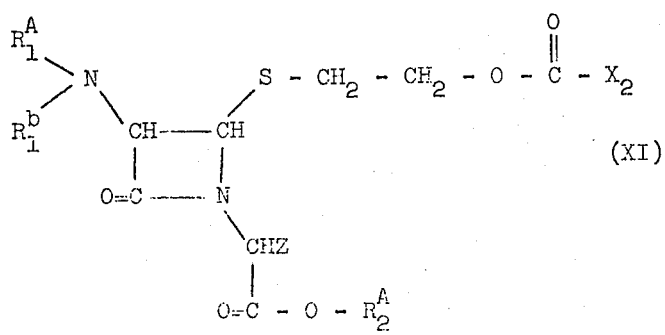

(XI)

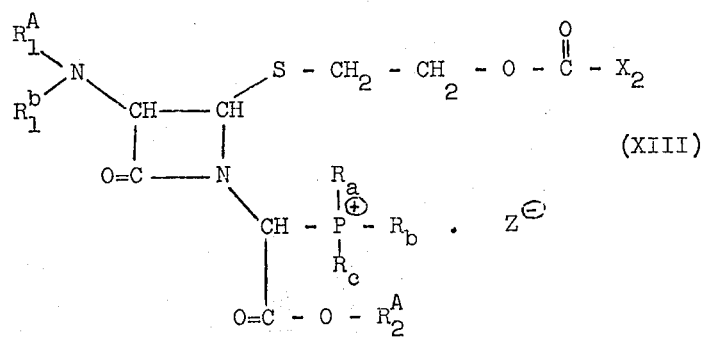

(XIII)

obtainable as an intermediate product, the phosphoranylidene compound of the formula

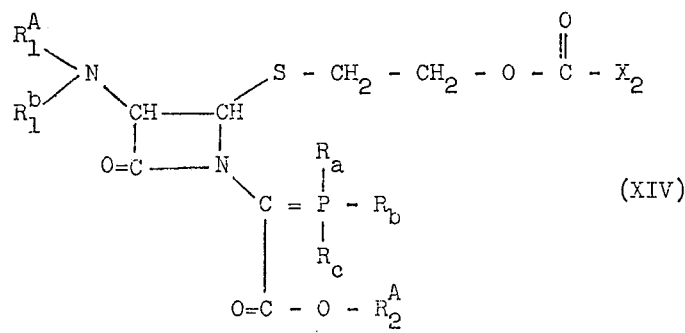

in which the esterified carboxyl grouping —C(=O)—X$_2$ is split. in which the esterified carboxyl grouping —C(=O)—X$_2$ is split.

A compound of the formula

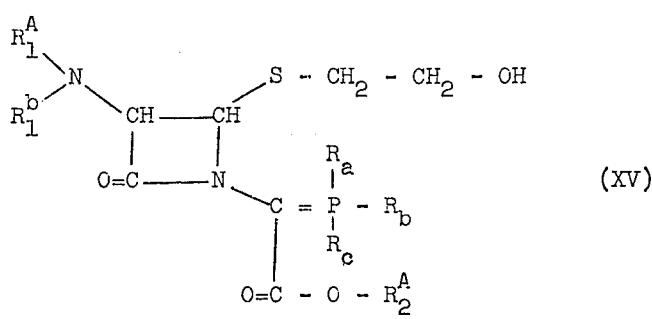

is thus obtained in which the hydroxyl group is oxidised to the oxo group. In a ceph-3-em compound of the formula

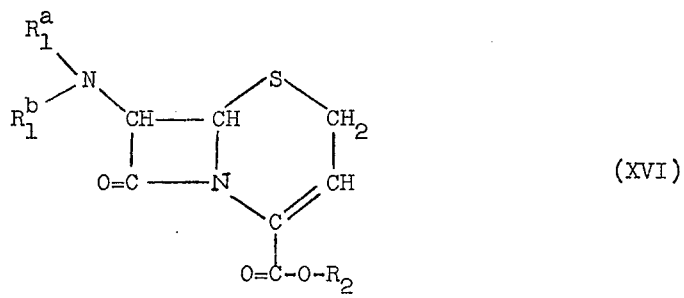

thus obtainable, in which $R_1^a$ represents an amino protective group $R_1^A$ and R$_2$ represents the organic radical $R_2^A$, and which is produced by cyclisation from the carbonyl compound of the formula

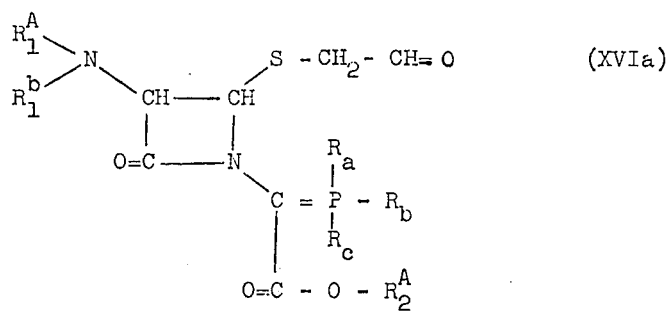

which is formed under the reaction conditions but is not isolated, it is possible, if desired, to replace an amino protective group $R_1^A$ and/or $R_1^b$ and optionally to protect the free amino group in a resulting compound, and/or, if desired, to convert a protected carboxyl grouping of the formula —C(=O)—O—$R_2^A$ into the free carboxyl group or into a different ester grouping of the formula —C(=O)—O—$R_2^A$, and optionally to convert a free carboxyl group into a protected carboxyl group of the formula —C(=O)—O—$R_2^A$, and/or if desired, to convert a resulting compound having a salt-forming group into a salt or convert a salt obtained into the free compound or into a different salt, and/or, if desired, to separate a resulting isomer mixture into the individual isomers.

Possible reducing agents in the manufacture of the compounds of the formula VII from compounds of the formula I by treatment with the ethylene oxide VI are, above all, chemical reducing agents, such as, for example, those mentioned above, especially zinc in the presence of 90 percent strength aqueous acetic acid, the process being carried out under mild conditions, for example at room temperature or even with cooling.

In a compound of the formula VII, the hydroxyl group is converted by acylation into the acyloxy group of the formula $-O-C(=O)-X_2$, especially into a group of the formula $-O-C(=O)-O-R_o^a$, $-O-C(=O)-O-R_o^b$, $-O-C(=O)-O-R_o^c$, $-O-C(=O)-R_o^d$ or $-O-C(=O)-O-R_o^e$, wherein $R_o^a$, $R_o^b$, $R_o^c$, $R_o^d$ and $R_o^e$ have the above-mentioned meanings, and above all represent 2,2,2-trichloroethyl, phenacyl, 4,5-dimethoxy-2-nitro-benzyl or tert.-butyl radicals, and also into a group of the formula $-O-C(=O)-O-R_o^f$, wherein $R_o^f$ represents an organic radical which together with a carboxyl group forms an esterified carboxyl group which can be split under hydrolytic conditions, such as an activated ester grouping, and in particular denotes a cyanomethyl, 4-nitrophenyl, 4-nitrobenzyl, phthalimidomethyl or succinimidomethyl group.

The acylation reaction can be carried out in a manner which is in itself known, for example like the acylation of an amino group, described above, and it is possible to employ the customary acylating agents, especially suitable reactive derivatives of acids, if necessary in the presence of a preferably basic agent, such as an organic tertiary base, for example triethylamine or pyridine. Reactive derivatives of acids are, for example, anhydrides, including internal anhydrides, such as ketenes, or isocyanates, or mixed anhydrides which can in particular be produced with halogenoformic acid esters, for example chloroformic acid ethyl ester, or halogenoacetic acid halides, for example trichloroacetic acid chloride, and also halides, above all chlorides, or reactive esters, such as esters of acids with alcohols or phenols containing electron-attracting groupings, as well as with N-hydroxy compounds, for example cyanomethanol, 4-nitrophenol or N-hydroxysuccinimide. The acyl group can also be introduced in stages; thus it is possible, for example, to treat a compound of the formula VII with a carbonic acid halide, for example phosgene, and to convert the compound thus obtainable, of the formula VIII, wherein $X_2$ represents a halogen atom, for example a chlorine atom, into the desired compound of the formula VIII by means of a suitable alcohol, for example 2,2,2-trichloroethanol, tert.-butanol or phenacyl alcohol. The acylation reaction can be carried out in the presence or absence of solvents or solvent mixtures, if necessary with cooling or warming, in a closed vessel under pressure and/or in an inert gas atmosphere, for example a nitrogen atmosphere, and in stages if desired.

In a glyoxylic acid compound of the formula IX, the radical $R_2^A$ above all represents a group $R_o^a$, $R_o^b$, $R_o^c$, $R_o^d$, $R_o^e$ or $R_o^f$.

The addition of the glyoxylic acid ester compound of the formula IX to the nitrogen atom of the lactam ring of a compound of the formula VIII preferably takes place at elevated temperature, above all at about 50°C to about 150°C, and in particular in the absence of a condensation agent and/or without the formation of a salt. Instead of the free glyoxylic acid ester compound it is also possible to use a reactive oxo derivative thereof, above all a hydrate, and when using the hydrate water produced can be removed, if necessary, by distillation, for example azeotropically.

The process is preferably carried out in the presence of a suitable solvent, such as, for example, dioxane or toluene, or solvent mixture, if desired or required in a closed vessel under pressure and/or in the atmosphere of an inert gas, such as nitrogen.

In a compound of the formula X, the secondary hydroxyl group can be converted, in a manner which is in itself known, into a reactive hydroxyl group esterified by a strong acid, especially into a halogen atom or into an organic sulphonyloxy group. For this, suitable halogenating agents are for example used, such as a thionyl halide, for example thionyl chloride, a phosphorus oxyhalide, especially phosphorus oxychloride, or a halogenophosphonium halide, such as triphenylphosphonium dibromide or diiodide, as well as a suitable organic sulphonic acid halide, such as a sulphonic acid chloride, the reaction preferably being carried out in the presence of a basic agent, above all an organic basic agent, such as an aliphatic tertiary amine, for example triethylamine or diisopropylethylamine, or of a heterocyclic base of the pyridine type, for example pyridine or collidine. The process is preferably carried out in the presence of a suitable solvent, for example dioxane or tetrahydrofurane, or of a solvent mixture if necessary with cooling and/or in the atmosphere of an inert gas, such as nitrogen.

In a resulting compound of the formula XI a reactive esterified hydroxyl group Z can be converted in a manner which is in itself known, into a different reactive esterified hydroxyl group. Thus it is for example possible to replace a chlorine atom by a bromine or iodine atom by treating the corresponding chlorine compound with a suitable bromine or iodine reagent, especially with an inorganic bromide or iodide salt, such as lithium bromide, preferably in the presence of a suitable solvent, such as ether.

In a compound of the formula XII, each of the groups $R_a$, $R_b$ and $R_c$ above all denotes a lower alkyl radical which is optionally substituted, for example by etherified or esterified hydroxyl groups, such as lower alkoxy groups or halogen atoms, or a phenyl radical which is optionally substituted, for example by aliphatic hydrocarbon radicals, such as lower alkyl groups, or etherified or esterified hydroxyl groups, such as lower alkoxy groups or halogen atoms, or nitro groups.

The reaction of a compound of the formula XI with the phosphine compound of the formula XII, wherein each of the group $R_a$, $R_b$ and $R_c$ above all represents a phenyl radical or a lower alkyl radical, especially the n-butyl radical, is preferably carried out in the presence of a suitable inert solvent, such as an aliphatic, cycloaliphatic or aromatic hydrocarbon, for example hexane, cyclohexane, benzene or toluene, or of an ether, for example dioxane, tetrahydrofurane or diethylene glycol dimethyl ether, or of a solvent mixture. If necessary, the process is carried out with cooling or at elevated temperature and/or in the atmosphere of an inert gas, such as nitrogen.

A phosphonium salt compound of the formula XIII, formed as an intermediate, usually spontaneously loses the elements of the acid of the formula H-Z (XIIIa); if necessary, the phosphonium salt compound can be decomposed by treatment with a weak base, such as an organic base, for example diisopropylethylamine or pyridine, and converted into the phosphoranylidene compound of the formula XIV.

The splitting of the esterified carboxyl group of the formula $-C(=O)-X_2$ in a compound of the formula XIV can be carried out in various ways, depending on the nature of the group $X_2$. Thus it is possible to split a grouping $-C(=O)-X_2$, wherein $X_2$ represents the group of the formula $-O-R_o{}^a$ or $-O-R_o{}^b$, by treatment with a chemical reducing agent, for example one of the abovementioned reducing agents, such as zinc, which is advantageously used in the presence of an acid or an alcohol, optionally with the addition of water, for example in the presence of aqueous acetic acid, and to split a grouping of the formula $-C(=O)-X_2$, wherein $X_2$ represents the group of the formula $-O-R_o{}^c$, by irradiation with light, especially with ultra-violet light; these splitting reactions can be carried out according to the processes described above.

An esterified carboxyl grouping of the formula $-C(=O)-O-R_o{}^d$ or $-C(=O)-O-R_o{}^e$ can be split by treatment with an acid agent, especially with an acid, such as a strong organic carboxylic acid, for example an optionally substituted lower alkanecarboxylic acid which preferably contains halogen atoms, such as acetic acid or trifluoroacetic acid, and also with formic acid or a strong organic sulphonic acid, for example p-toluene-sulphonic acid. In this reaction, an excess of an acid reagent which is liquid under the reaction conditions is usually employed as the diluent, and the process carried out at room temperature or with cooling, for example to between about $-20°C$ and about $+10°C$.

An esterified carboxyl grouping $-C(=O)-O-R_o{}^f$ can be split hydrolytically under neutral or weakly acid or weakly basic conditions, for example at a pH value of about 4 to about 9, for example by treatment with water, with a weakly acid agent, such as a weak acid or a weakly acid buffer solution, or with a weakly basic agent, such as an alkali metal bicarbonate, such as sodium bicarbonate, or a suitable buffer (pH about 7 to about 9), such as a dipotassium hydrogen phosphate buffer, in the presence of water and preferably of an organic solvent, such as methanol or acetone.

In a compound of the formula XIV, the esterified carboxyl groups of the formulae $-C(=O)-X_2$ and $-C(=O)-O-R_2{}^4$ preferably differ from one another in that under the conditions of splitting the esterified carboxyl group of the formula $-C(=O)-X_2$ the esterified carboxyl group of the formula $-C(=O)-O-R_2{}^4$ remains intact. If, for example, the esterified carboxyl group of the formula $-C(=O)-X_2$ represents an esterified carboxyl group which can be split on treatment with a chemical reducing agent, such as zinc in the presence of aqueous acetic acid, for example a grouping of the formula $-C(=O)-O-R_o{}^a$ or $-C(=O)-O-R_o{}^b$, wherein $R_o{}^a$ preferably represents the 2,2,2-trichloroethyl or 2-iodoethyl radical, or the 2-bromoethyl radical which can easily be converted into the latter, and $R_o{}^b$ above all represents the phenacyl group, the esterified carboxyl group of the formula $-C(=O)-O-R_2{}^4$ for example represents an esterified carboxyl group $-C(=O)-O-R_2{}^4$ which can be split on treatment with a suitable acid, such as trifluoroacetic acid, for example a grouping of the formula $-C(=O)-O-R_o{}^d$, wherein $R_o{}^d$ preferably represents the tert.-butyl group.

The oxidation of a compound of the formula XV can surprisingly be effected by treatment with an oxidising organic sulphoxide compound in the presence of agents possessing dehydrating or water-absorbing properties. Possible oxidising sulphoxide compounds are above all aliphatic sulphoxide compounds, such as di-lower alkylsulphoxides, above all dimethylsulphoxide, or lower alkylenesulphoxides, for example tetramethylenesulphoxide. As agents with dehydrating or water-absorbing properties, acid anhydrides should above all be mentioned, especially anhydrides of organic carboxylic acids, such as aliphatic or aromatic carboxylic acids, for example anhydrides of lower alkanecarboxylic acids, especially acetic anhydrides, and also propionic anhydride or benzoic anhydride, as well as anhydrides of inorganic acids, especially of phosphoric acids, such as phosphorus pentoxide. The above anhydrides, above all of organic carboxylic acids, for example acetic anhydride, are preferably used in an approximately 1:1 mixture with the sulphoxide oxidising agents. Further dehydrating or water-absorbing agents are carbodiimides, above all dicyclohexylcarbodiimide, but also diisopropylcarbodiimide, or ketenimines, for example diphenyl-N-p-tolylketenimine; these reagents are preferably used in the presence of acid catalysts, such as phosphoric acid or pyridinium trifluoroacetate or pyridinium phosphate. Sulphur trioxide can also be used as a dehydrating or water-absorbing agent, being normally employed in the form of a complex, for example with pyridine.

Usually, the sulphoxide oxidising agent is used in excess. Sulphoxide compounds which are liquid under the reaction conditions, especially dimethylsulphoxide, can, for example, simultaneously serve as solvents; additionally, inert diluents, such as benzene, or mixtures of solvents, can be used as solvents.

The above oxidation reaction is carried out with cooling if desired, but in most cases at room temperature or slightly elevated temperature. Hereupon an aldehyde compound of the formula XVIa, obtainable as an intermediate product according to the process, is directly cyclised under the reaction conditions, and without being isolated, to give the 7β-aminoceph-3-em-4-carboxylic acid compound of the formula XVI.

In a resulting compound of the formula XVI, a protective group $R_2{}^4$, especially an easily removable acyl group, can be split off in a manner which is in itself known, a tert.-butoxycarbonyl group for example by treatment with trifluoroacetic acid, and a 2,2,2-trichloroethoxycarbonyl group by treatment with a suitable metal or a metal compound, for example tin, or with a chromium-II compound, such as chromium-II chloride or chromium-II acetate advantageously in the presence of a hydrogen-releasing agent which together with the metal or the metal compound generates nascent hydrogen, preferably in the presence of aqueous acetic acid. It is furthermore possible, in a resulting compound of the formula XVI, wherein a carboxyl group $-C(=O)-O-R_2$ preferably represents a carboxyl group which is protected, for example by esterification, including by silylation or stannylation, for example with a suitable organic halogenosilicium compound or a halogeno-tin-IV compound, such as trimethylchlorosilane, to remove a suitable acyl group $R_1{}^A$, wherein free functional groups which may be present are preferably protected, by treatment with an imidehalide-forming agent, such as a suitable inorganic acid halide, for example phosphorus pentachloride, preferably in the presence of a basic agent, such as pyridine, reaction of the resulting imide-halide with an alcohol, such as a lower alkanol, for example methanol, and splitting of the imino-ether formed in an aqueous or alcoholic medium, preferably under acid conditions. A triaryl methyl group $R_1^4$, for example a trityl group, can, for example, be removed by treatment with an acid agent, such as a mineral acid, for example hydrochloric acid.

In a compound of the formula XVI, wherein $R_1^a$ and $R_1^b$ denote hydrogen, the free amino group can be protected, especially acylated, according to substitution processes which are in themselves known, for example as described above.

In a compound of the formula XVI having an esterified carboxyl group, wherein the latter for example represents an esterified carboxyl group of the formula $-C(=O)-O-R_2^A$ which can easily be converted into the free carboxyl group, this esterified carboxyl group can be converted into the free carboxyl group in a manner which is in itself known, for example in accordance with the nature of the esterifying radical $R_2^A$, a grouping of the formula $-C(=O)-O-R_o^a$ or $-C(=O)-O-R_o^b$ for example by treatment with a chemical reducing agent, such as a metal, for example zinc, or a reducing metal salt, such as a chromium-II salt, for example chromium-II chloride, usually in the presence of a hydrogen-releasing agent which together with the metal can generate nascent hydrogen, such as an acid, above all acetic acid, or an alcohol, water preferably being added, a grouping of the formula $-C(=O)-O-R_o^c$, for example by irradiation, preferably with ultra-violet light, using ultra-violet light of shorter wavelengths, for example below 290 m$\mu$, if $R_o^c$ represents, for example, an arylmethyl radical which is optionally substituted in the 3-, 4- and/or 5-position, for example by lower alkoxy groups and/or nitro groups, or using ultra-violet light of longer wavelengths, for example above 290 m$\mu$, if $R_o^c$ denotes, for example, an arylmethyl radical substituted in the 2-position by a nitro group, a grouping $-C(=O)-O-R_o^d$ or $-C(=O)-O-R_o^e$ for example by treatment with an acid agent, such as formic acid or trifluoroacetic acid, and a grouping $-C(=O)-O-R_o^f$ for example by hydrolysis, for example, depending on the nature of the radical $R_o^f$, by treatment with an aqueous, weakly acid or weakly basic agent, such as aqueous sodium bicarbonate or an aqueous potassium phosphate buffer.

In a compound of the formula XVI, a grouping of the formula $-C(=O)-O-R_2^A$ can be converted into another grouping of this formula, for example a 2-bromoethoxycarbonyl group of the formula $-C(=O)-O-R_o^a$ can be converted into a 2-iodoethoxycarbonyl group by treatment with an iodine salt, such as sodium iodide, in the presence of a suitable solvent, such as acetone.

An amino or carboxyl group which is protected, for example by silylation, can be liberated in the usual manner, for example by treatment with water or an alcohol.

In a compound of the formula XVI having a group of the formula $-C(=O)-O-R_2$, wherein $R_2$ represents hydrogen, the free carboxyl group can be esterified in a manner which is in itself known, for example by treatment with a diazo compound, such as a diazo-lower alkane, for example diazomethane or diazoethane, or with a phenyl-diazo-lower alkane, for example phenyldiazomethane or diphenyldiazomethane, or by reaction with an alcohol suitable for esterification, in the presence of an esterifying agent, such as a carbodiimide, for example dicyclohexylcarbodiimide, or carbonyldiimidazole, or in accordance with any other known and suitable esterification process, such as reaction of a salt of the acid with a reactive ester of an alcohol and a strong inorganic acid or a strong organic sulphonic acid. It is furthermore possible to convert acid halides, such as acid chlorides (manufactured, for example, by treatment with oxalyl chloride) or activated esters, for example those with N-hydroxy-nitrogen compounds, or mixed anhydrides, for example formed with halogenoformic acid lower alkyl esters, such as chloroformic acid ethyl ester, or with halogenoacetic acid halides, such as trichloroacetic acid chloride, into esters by reaction with alcohols, optionally in the presence of a base, such as pyridine.

In the above process stages it is possible, if necessary, transiently to protect, in a manner which is in itself known, free functional groups in the reactants which do not participate in the reaction, for example free hydroxyl, mercapto and amino groups, for example by acylation, tritylation or silylation, and free carboxyl groups, for example by esterification, including silylation, and, if desired, to liberate these groups in a manner which is in itself known after the particular reaction has taken place.

The compounds of the formula XVI, especially those in which $R_1^a$ represents an acyl radical contained in pharmacologically active, naturally occurring or biosynthesisable or semisynthesisable or totally synthesisable N-acyl derivatives of 6-amino-penicillanic acid compounds or 7-amino-cephalosproanic acid compounds, $R_1^b$ is hydrogen, and $R_2$ denotes hydrogen or an organic radical $R_2^A$ which can easily be removed under physiological conditions, are active against micro-organisms, such as Gram-positive bacteria, for example against *Staphylococcus aureus* (for example, in mice in doses of about 0.0001 to about 0.02 g/kg p.o., especially of about 0.001 to about 0.01 g/kg p.o.), and Gram-negative bacteria, for example against *Escherichia coli* (for example, in mice in doses of about 0.001 to about 0.05 g/kg p.o., especially of about 0.005 to about 0.049 g/kg p.o.), and especially also against penicillin-resistant bacteria.

Such compounds possessing pharmacological actions can be used, for example, in the form of pharmaceutical preparations in which they are present mixed with a solid or liquid pharmaceutical excipient, and which are suitable for enteral, parenteral or topical administration. Suitable excipients, which are inert towards the active substances, are, for example, water, gelatine, saccharides, such as lactose, glucose or sucrose, starches, such as corn starch, wheat starch or arrowroot, stearic acid or salts thereof, such as magnesium stearate or calcium stearate, talc, vegetable fats and oils, alginic acid, benzyl alcohols, glycols or other known excipients. The preparations can be in a solid form, for example as tablets, dragees, capsules or suppositories, or in a liquid form, for example as solutions, suspensions or emulsions. They can be sterilised and/or contain auxiliary substances, such as preservatives, stabilisers, wetting agents or emulsifiers, solubilising agents, salts for regulating the osmotic pressure and/or buffers. They can furthermore contain other pharmacologically usable substances. The pharmaceutical preparations, which are also encompassed by the present invention, can be manufactured in a manner which is in itself known.

The invention is described in the examples which follow.

EXAMPLE 1

A solution of 1.64 g of 3-isopropyl-4-thia-2,6-diazabicyclo[3.2.0]heptan-7-one in 33 ml of a 1:1 mixture of acetic acid and water is treated, over the course of 10 minutes with 71.7 ml of an 0.5 N solution of iodine in ethanol, and the mixture is left to stand for one hour at room temperature and then concentrated under reduced pressure. The residue, dried under a high vacuum, contains the bis-(cis-3β-amino-2-oxo-4β-azetidinyl)-disulphide of the formula

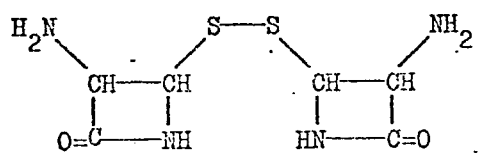

and is suspended in 90 ml of acetonitrile and treated with 4.5 ml of pyridine and 4.5 ml of phenylacetic acid chloride at 0°C. The mixture is left to stand for 15 minutes at 0°C and then for one hour at room temperature and is then evaporated under reduced pressure. The product is triturated for 30 minutes with 10 ml of a 1:1 mixture of dioxane and water, and the residue is taken up in ethyl acetate; the solution is washed with a saturated aqueous sodium bicarbonate solution and a saturated aqueous sodium chloride solution, dried and evaporated. The oily residue is chromatographed on 100 g of pure silica gel; the oily bis-(cis-2-oxo-3β-phenylacetylamino-4β-azetidinyl)-disulphide of the formula

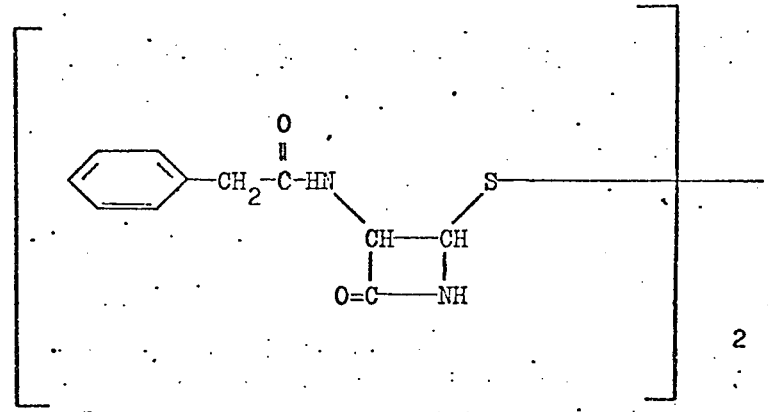

is eluted with a 19:1 mixture of ethyl acetate and acetone and converted into the form of an amorphous fine powder by lyophilisation; thin layer chromatogram (silica gel): Rf~0.36 (system: ethyl acetate/acetone, 1:1); infrared absorption spectrum (in potassium bromide): characteristic bands at 3.08μ, 5.62μ, 5.97μ and 6.51μ.

The starting material can be manufactured as follows:

15 ml of a sulphonic acid type of ion exchanger (H⁺-form are converted into the triethylammonium salt form by treatment with a solution of 5 ml of triethylamine in 100 ml of water, the column is washed with 300 ml of water until neutral and treated with a solution of 2 g of the sodium salt of penicillin-G in 10 ml of water, and then eluted with water. A volume of 45 ml is withdrawn and lyophilised at a pressure of 0.01 mm Hg. The crude triethylammonium salt of penicillin-G, thus obtained, is dissolved in methylene chloride and the solution is dried over sodium sulphate, filtered and evaporated.

A solution of the penicillin-G triethylammonium salt thus obtainable, in a mixture of 40 ml of methylene chloride and 40 ml of tetrahydrofurane, is cooled to −10°C and 2.9 ml of a 10 ml solution of 2 ml of chloroformic acid ethyl ester in tetrahydrofurane are slowly added, whilst stirring. The mixture is stirred for 90 minutes at −5° to 0°C, a solution of 0.395 g of sodium azide in 4 ml of water is then added, and the mixture is stirred for 30 minutes at −5° to 0°C. It is diluted with 100 ml of ice water and extracted three times with 75 ml of methylene chloride at a time; the organic extracts are washed with water, dried and evaporated at room temperature under reduced pressure. The amorphous penicillin-G azide is thus obtained, infrared absorption spectrum (in methylene chloride): characteristic bands at 3.05μ, 4.71μ, 5.62μ, 5.80μ, 5.94μ, 6.69μ and 8.50μ.

A solution of 1.72 g of the penicillin-G azide in 30 ml of benzene is treated with 1.5 ml of 2,2,2-trichloroethanol and stirred for 25 hours at 70°C. During the first 15 minutes, a steady evolution of nitrogen is observed, and after some hours the product separates out from the solution. The mixture is diluted with 60 ml of hexane whilst stirring and cooled, and is filtered after 15 minutes. The filter residue is washed with a 2:1 mixture of benzene and hexane and with cold ether. Pure 2,2-dimethyl-6β-phenylacetylamino-3-(2,2,2-trichloroethoxy-carbonyl-amino)-penam is thus obtained, melting at 223°–223.5°C; $[\alpha]_D^{20} = +172°$(c = 1.018 in ethanol); infrared absorption spectrum (in methylene chloride); characteristic bands at 3.04μ 5.61μ, 5.77μ, 6.97μ, 6.70μ, 8.30μ, 9.17μ, 9.62μ and 11.85μ.

The product can also be obtained of 0.03 g of the penicillin-G azide in 2 ml of benzene are warmed to 70°C for 20 minutes, the reaction mixture is evaporated under reduced pressure to yield 3-isocyanato-2,2-dimethyl-6β-phenyl-acetylamino-penam; infrared absorption spectrum (in methylene chloride): characteristic bands at 3.06μ, 4.48μ, 5.62μ, 5.96μ and 6.70μ; and this compound is converted, by reaction with 2,2,2-trichloroethanol, into the desired 2,2-dimethyl-6β-phenylacetylamino-3-(2,2,2-trichloroethoxycarbonyl-amino)-penam.

A solution of 11.0 g of 2,2-dimethyl-6β-phenylacetylami-no-(2,2,2-trichloroethoxycarbonyl-amino)-penam in a mixture of 240 ml of anhydrous methylene chloride and 25.6 ml of pyridine is treated at −10°C, under a nitrogen atmosphere, with 166 ml of a 10 percent strength of phosphorous pentachloride in methylene chloride, and the mixture is subsequently stirred for 30 minutes at 0°C. 120 ml of absolute methanol are then added, whilst cooling strongly (−10°C), and the mixture is stirred for a further 2 hours. 80 ml of water are added, the pH value (measured in samples diluted with water) is adjusted to 3.3 with about 9 ml of a 2 N aqueous sodium hydroxide solution, and the reaction is allowed to take place for one hour at 0°C and for a further hour at 20°C. The mixture is then poured out onto 500 ml of a 1 M aqueous dipotassium hydrogen phosphate buffer solution, whilst stirring, and the pH value is adjusted from 6.5 to 7.0 by adding 50 percent strength aqueous tripotassium phosphate solution. The aqueous phase is separated off and twice washed with 200 ml of methylene chloride at a time; the three organic solutions are each twice washed with water, combined, dried over sodium sulphate and evaporated under reduced pressure. The crystalline residue is taken up in 40 ml of a 1:1 mixture of benzene and hexane; the mixture is cooled for 15 minutes at 0°C and the precipitate is filtered off 6$\beta$-Amino-2,2-dimethyl-3-(2,2,2-trichloroethoxycarbonylamino)-penam is thus obtained, melting at 179°–180°C (corrected); infrared absorption spectrum: characteristic bands (in methylene chloride) at 2.90$\mu$, 5.58$\mu$, 6.62$\mu$, 7.17$\mu$, 7.27$\mu$, 8.32$\mu$, 8.46$\mu$, 8.82$\mu$, 9.25$\mu$ and 9.62$\mu$; (in Nujol) at 2.95$\mu$, 3.01$\mu$, 3.11$\mu$, 5.64$\mu$, 5.80$\mu$, 6.35$\mu$, 7.60$\mu$, 7.87$\mu$, 8.00$\mu$, 8.27$\mu$, 8.65$\mu$, 8.70$\mu$, 9.16$\mu$ and 9.57$\mu$; thin layer chromatogram (silica gel): Rf = 0.17 (in the system toluene/acetone, 8:2) and Rf = 0.43 (in the system toluene/acetone 6:4); characteristic yellow colouration with ninhydrin-collidine (free amino group).

A mixture of 0.05 g of 6$\beta$-amino-2,2-dimethyl-3-(2,2,2-trichloroethoxycarbonylamino)-penam and 0.1 g of zinc dust in 2 ml of a 1:1 mixture of acetone and water is treated with 0.2 ml of acetic acid and is then vibrated at 20°C for one hour with 45 kHz (ultrasonics), thereafter diluted with 50 ml of water. The mixture is extracted with 50 ml of ethyl acetate and the organic extract is dried over sodium sulphate and evaporated under reduced pressure. The residue is recrystallised from a mixture of methylene chloride and hexane, and 3-isopropyl-4-thia-2,6-diazabicyclo[3.2.0]heptan-7-one is thus obtained, melting point 151°–155°C; thin layer chromatogram: Rf = 0.17 (system: toluene/acetone, 8:2) and Rf = 0.38 (system: toluene/acetone, 6:4).

In the above process, 0.2 g of ammonium chloride or 0.2 g of pyridine hydrochloride can be used instead of the acetic acid.

EXAMPLE 2

A solution of 0.317 g of 3,3-dimethyl-4-thia-2,6-diazabicyclo[3.2.0]heptan-7-one in 3.0 ml of methylene chloride is treated with 0.254 g of iodine in 12.0 ml of benzene; hereupon a voluminous brown precipitate immediately forms. The mixture is periodically shaken over the course of 10 minutes at room temperature and then filtered, and the filter residue, which contains the hydriodide salt of bis-(cis-3$\beta$-isopropylideneamino-2-oxo-4$\beta$-azetidinyl)-disulphide, is washed with benzene and pentane and suspended in 8.0 ml of acetonitrile. The suspension is treated with 2.0 ml of pyridine, whereupon a clear yellow solution is obtained which is cooled to +10°C and treated with 0.4 ml of phenyl acetic acid chloride added dropwise, whilst stirring. The reaction mixture is left to stand for 20 minutes at room temperature and is then concentrated to a weight of 1.9 g under reduced pressure. The yellow, syrupy residue is taken up in 50 ml of ethyl acetate and the solution is washed with 50 ml of water and then evaporated. The residue is crystallised from a mixture of methanol, methylene chloride and hexane. Bis-(cis-2-oxo-3$\beta$-phenylacetylamino-4$\beta$-azetidinyl)-disulphide melts at 152–155°C after recrystallisation from acetone and methylene chloride (analytical preparation: 156.5°–158.5°C).

EXAMPLE 3

A solution of 10.0 g of 3-isopropyl-4-thia-2,6-diazabicyclo[3.2.0]heptan-7-one in 200 ml of a 1:1 mixture of acetic acid and water is treated dropwise, over the course of 15 minutes, with 436 ml of an 0.2 molar solution of iodine in ethanol, and after standing for one hour at room temperature the mixture is evaporated under reduced pressure. The residue, containing bis-(cis-3$\beta$-amino-2-oxo-4$\beta$-azetidinyl)-disulphide, is dried under a high vacuum and further converted without purification.

The crude product obtainable according to the above process is dissolved in 200 ml of a 1:1 mixture of tetrahydrofurane and water, 8.4 ml of triethylamine are added and the whole is slowly added dropwise to a mixture, cooled to −10°C, of N-tert.-butoxycarbonyl-D-$\alpha$-phenylglycine, 8.95 ml of triethylamine and 8.40 g of chloroformic acid isobutyl ester in 170 ml of tetrahydrofurane. After one hour at 0°C and a further hour at room temperature, the reaction mixture is concentrated to half, and is taken up in 800 ml of ethyl acetate. The solution is twice washed with 200 ml at a time of a saturated aqueous sodium bicarbonate solution and twice with 200 ml at a time of a saturated aqueous sodium chloride solution dried over sodium sulphate and evaporated. The residue is chromatographed on 500 g of silica gel. Bis-[cis-3$\beta$-(N-tert-butoxycarbonyl-D-$\alpha$-phenylglycyl)-amino-2-oxo-4$\alpha$-azetidinyl]disulphide of the formula

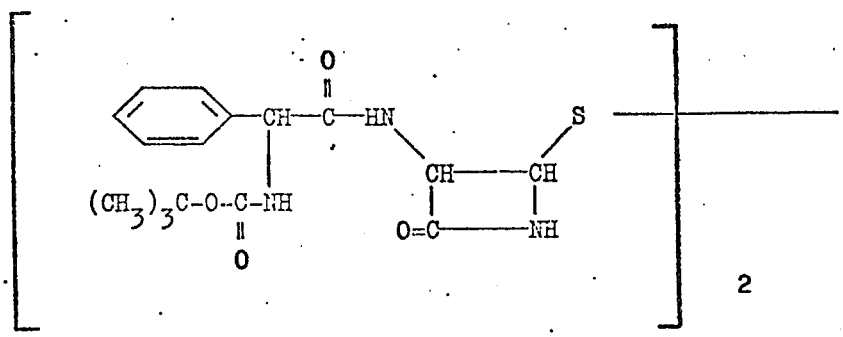

is eluted with ethyl acetate. The amorphous product melts, with decomposition, at 163°–166°C; $[\alpha]_D^{20} = +145° \pm 1°$ (c = 0.930 in chloroform); thin layer chromatogram (silica gel; development with iodine vapour): Rf ~0.33 (system: ethyl acetate); ultra-violet absorption spectrum (in ethanol): $\lambda_{max} = 257$ m$\mu$ ($\epsilon = 2,200$); infrared absorption spectrum (in methylene chloride): characteristic bands at 2.90$\mu$, 2.98$\mu$, 3.34$\mu$, 5.63$\mu$, 5.90$\mu$, 6.68$\mu$, 7.29$\mu$, 8.11$\mu$, 8.58$\mu$ and 9.53$\mu$.

The bis-(cis-2-oxo-3$\beta$-acylamino-4$\beta$-azetidinyl)-disulphides of the above examples can be further converted as follows:

A: A solution of 0.35 g of bis-(cis-2-oxo-3$\beta$-phenylacetylamino-4$\beta$-azetidinyl)-disulphide in 16 ml of a 9:1 mixture of acetic acid and water is mixed, at about 5°C, with about 3.2 g of ethylene oxide, and then with 3.5 g of zinc dust. The reaction mixture is stirred for 15 minutes at about 5°C and for 30 minutes at room temperature, and is then filtered. The filter residue is rinsed with acetone and the filtrate is evaporated. The residue is taken up in about 150 ml of ethyl acetate and the solution is washed with 50 ml of a saturated aqueous sodium bicarbonate solution and with 100 ml of a saturated aqueous sodium chloride solution, dried and evaporated. The residue, together with a crude product obtained analogously from 0.58 g of bis-(cis-2-oxo-3$\beta$-phenylacetylamino-4$\beta$-azetidinyl)-disulphide, is chromatographed on 50 g of silica gel. Elution with a 19:1 mixture yields 4$\beta$-(2-hydroxyethylmercapto)-3$\beta$-phenylacetylamino-azetidin-2-one as a single product, which after crystallisation from a mixture of acetone and diethyl ether melts at 141°–142°C; $[\alpha]_D^{20} = +44° \pm 2°$ (c = 0.571 in ethanol); thin layer chromatography (silica gel; development with iodine): Rf 0.45 (system: ethyl acetate/acetone, 1:1); infrared absorption spectrum (in mineral oil): characteristic bands at 3.01$\mu$, 5.68$\mu$, 6.01$\mu$, 6.43$\mu$ and 6.52$\mu$.

1.38 g of chloroformic acid 2,2,2-trichloroethyl ester in 5 ml of tetrahydrofurane, followed by 1.06 g of pyridine in 5 ml of tetrahydrofurane, are added dropwise, at 0°C, to a solution of 0.61 g of 4$\beta$-(2-hydroxyethylmercapto)-3$\beta$-phenylacetylamino-azetidin-2-one in 10 ml of tetrahydrofurane. The reaction mixture is stirred under a nitrogen atmosphere for 15 minutes at 0°C and for 2 hours at room temperature, and is then taken up in 150 ml of methylene chloride. The solution is washed with saturated aqueous sodium chloride solution, dried and evaporated. The residue is chromatographed on a 50-fold amount of silica gel; 3$\beta$-phenylacetylamino-4$\beta$-[2-(2,2,2-trichloroethoxycarbonyloxy)-ethylmercapto]-azetidin-2-one is eluted with a 1:1 mixture of methylene chloride and ethyl acetate. After crystallisation, and one recrystallisation from diethyl ether, the product is obtained in the form of colourless needles, melting point 99°–101°C; thin layer chromatogram (silica gel): Rf~0.46 (system: ethyl acetate; development with iodine); $[\alpha]_D^{20} = +3° \pm 2°$ (c = 0.518 in chloroform); infrared absorption spectrum (in methylene chloride): characteristic bands at 2.88$\mu$, 5.58$\mu$, 5.64$\mu$, 5.92$\mu$ and 6.62$\mu$.

A mixture of 1.0 g of 3$\beta$-phenylacetylamino-4$\beta$-[2-(2,2,2-trichloroethoxycarbonyloxy)-ethylmercapto]-azetidin-2-one and 3.0 g of glyoxylic acid tert.-butyl ester hydrate in 50 ml of benzene is boiled for 16 hours under reflux whilst separating off water, and is then cooled, twice washed with 25 ml of distilled water at a time, dried over sodium sulphate and evaporated, $\alpha$-Hydroxy-$\alpha$-{2-oxo-3$\beta$-phenylacetylamino-4$\beta$-[2-(2,2,2-trichloroethoxycarbonyloxy)-ethylmercapto]-1-azetidinyl}-acetic acid tert.-butyl ester is thus obtained and can be further converted without purification.

The crude $\alpha$-hydroxy-$\alpha$-{2-oxo-3$\beta$-phenylacetylamino-4$\beta$-[2-(2,2,2,-trichloroethoxycarbonyloxy)-ethylmercapto]-1-azetidinyl}-acetic acid tert.-butyl ester obtainable according to the above process is dissolved in 20 ml of a 1:1 mixture of dioxane and tetrahydrofurane, and 0.54 ml of pyridine in 2 ml of dioxane, and 0.48 ml of thionyl chloride in 10 ml of a 1:1 mixture of dioxane and tetrahydrofurane, are added dropwise, at $-10°C$. The reaction mixture is stirred for 30 minutes at $-10°C$ to $-5°C$ and for one hour under a nitrogen atmosphere, the precipitate is filtered off, and the filtrate containing the $\alpha$-chloro-$\alpha$-{2-oxo-3$\beta$-phenylacetylamino-4$\beta$-[2-(2,2,2-trichloroethoxycarbonyloxy)-ethylmercapto]-1-azetidinyl -acetic acid tert.-butyl ester is evaporated; the product is further converted in the crude state.

A solution of the crude $\alpha$-chloro-$\alpha$-{2-oxo-3$\beta$-phenylacetylamino -4$\beta$-[2-(2,2,2, -trichloroethoxycarbonyloxy)-acid tert.-butyl ester obtainable according to the above process, in 30 ml of a 1:1 mixture of dioxane and tetrahydrofurane, is treated with 1.15 g of triphenylphosphine and 0.35 ml of pyridine, and the mixture is warmed for 2 hours at 50°C and then evaporated to dryness. The residue is chromatographed on 30 g of pure silica gel, elution with a 1:1 mixture of toluene and ethyl acetate yielding $\alpha$-{2-oxo-3$\beta$-phenyl-acetylamino-4$\beta$-[2-(2,2,2-trichloroethoxycarbonyloxy)-ethyl-mercapto]-1-azetidinyl} -$\alpha$-triphenylphosphoranylidene-acetic acid tert.-butyl ester, which is contaminated with a little triphenylphosphine oxide and can be purified by preparative thin layer chromatography (silica gel; development with iodine); Rf~0.57 (system: toluene/acetone, 1:1); infrared absorption spectrum (in methylene chloride): characteristic bands at 3.00$\mu$, 3.42$\mu$, 5.68$\mu$, 5.97$\mu$, 6.10$\mu$ and 6.65$\mu$.

A mixture of 0.225 g of $\alpha$-{2-oxo-3$\beta$-phenylacetylamino-4$\beta$-[2-(2,2,2,-trichloroethoxycarbonyloxy)-ethylmercapto]-1-azetidinyl}-$\alpha$-triphenylphosphoranylidene-acetic acid tert.-butyl ester in 10 ml of a 9:1 mixture of acetic acid and water is treated with 3.0 g of zinc dust and the whole is stirred for 45 minutes at 15°C. The mixture is filtered and the filtrate is evaporated; the residue is taken up in 50 ml of ethyl acetate and the solution is washed with 25 ml of a saturated aqueous sodium bicarbonate solution and twice with 25 ml at a time of a saturated aqueous sodium chloride solution, dried over sodium sulphate and evaporated. $\alpha$-[4$\beta$-(2-Hydroxyethylmercapto)-2-oxo-3$\beta$-phenylacetylamino-1-azetidinyl]-$\alpha$-triphenylphosphoranylidene-acetic acid tert.-butyl ester is thus obtained; thin layer chromatogram (silica gel; development with iodine): Rf ~ 0.24 (system: toluene/acetone, 1:1).

A mixture of 0.221 g of the crude $\alpha$-[4$\beta$-(2-hydroxyethylmercapto)-2-oxo-3$\beta$-phenylacetylamino-1-azetidinyl]-$\alpha$-triphenylphosphoranylidene-acetic acid tert.-butyl ester in 5 ml of dimethylsulphoxide and 5 ml of acetic anhydride is left to stand for 16 hours at room temperature and is then concentrated under reduced pressure. The residue is taken up in 100 ml of toluene; the organic solution is washed three times with 50 ml of distilled water at a time, dried over sodium sulphate and evaporated. The oily residue is chromatographed on 10 g of silica gel; the desired 7β-phenylacetyl-amino-ceph-3-em-4-carboxylic acid tert.-butyl ester, which forms by cyclisation from the α-(4β-formylmethylmercapto-2-oxo-3β-phenylacetyl-amino-1-azetidinyl)-α-triphenylphosphoranylidene-acetic tert.-butyl ester which is obtained as an intermediate and is not isolated, is eluted with a 4:1 mixture of toluene and ethyl acetate; thin layer chromatogram (silica gel): Rf ~ 0.48 (system: toluene /ethyl acetate, 1:1); ultraviolet absorption spectrum (in pure ethanol: $\gamma_{max}$ 258 mμ; infrared absorption spectrum (in methylene chloride): characteristic bands at 3.00μ, 3.48μ, 5.62μ, 5.81μ, 5.93μ, 6.10μ, 6.67μ, 7.15μ, 7.31μ, 7.70μ, 8.65μ and 9.03μ.

A mixture of 0.03 g of 7β-phenylacetylamino-ceph-3-em-4-carboxylic acid tert.-butyl ester and 0.5 ml of trifluoroacetic acid is left to stand for one hour at room temperature. The trifluoroacetic acid is then removed under reduced pressure and the residue is twice evaporated to dryness, in each case with 5 ml of a mixture of benzene and chloroform. The residue is chromatographed on 5 g of silica gel and 7β-phenylacetylaminoceph-3-em-4-carboxylic acid is eluted with methylene chloride, containing 5 percent of acetone; thin layer chromatogram (silica gel: development with iodine): Rf~0.49 (system: n-butanol/pyridine/acetic acid/water, 40:24:6:30).

B: A solution of 5.63 g of bis-[cis-3β-(N-tert.-butoxycarbonyl-D-α-phenylglycyl)-amino-2-oxo-4β-azetidinyl]-disulphide in 190 ml of a 9:1 mixture of acetic acid and water is treated with about 60 g of ethylene oxide and 56 g of zinc dust and vigorously stirred at room temperature for one hour. The mixture is filtered and the filtrate is concentrated, the residue is taken up in ethyl acetate, and the ethyl acetate solution is washed with a saturated aqueous sodium bicarbonate solution and a saturated aqueous sodium chloride solution, dried over sodium sulphate and evaporated. The residue is chromatographed on 150 g of silica gel; elution is carried out with ethyl acetate and yields 3β-(N-tert.-butoxycarbonyl-D-α-phenylglycyl)-amino-4β-(2-hydroxyethylthio)-azetidin-2-one, which after crystallisation from a mixture of acetone and diethyl ether melts at 130°–131°C; $[\alpha]_D^{20} = -64° \pm 2°$ (c = 0.622 in ethanol); thin layer chromatogram (silica gel; development with iodine vapour): Rf~0.47 (system: ethyl acetate/acetone, 1:1); infrared absorption spectrum (in methylene chloride): characteristic bands at 2.90μ, 3.00μ, 3.25μ, 3.34μ, 5.61μ, 5.83μ, 5.91μ, 6.68μ, 7.29μ, 8.58μ and 9.02μ.

A solution, cooled to 0°C, of 4.80 g of 3α-(N-tert.-butoxycarbonyl-D-α-phenylglycyl)-amino-4β-(2-hydroxyethylthio)-azetidin-2-one and 7.74 g of chloroformic acid 2,2,2-trichloroethyl ester in 100 ml of tetrahydrofurane is treated, over the course of 10 minutes, with a solution of 5.9 g of pyridine in 50 ml of tetrahydrofurane and the mixture is stirred for 15 minutes at 0°C and for 30 minutes at room temperature, and is concentrated. It is taken up in 500 ml of methylene chloride, twice washed with 100 ml of a saturated aqueous sodium chloride solution, and evaporated. The residue is chromatographed on 300 ml of silica gel; elution with a 4:1 mixture of methylene chloride and ethyl acetate yields the noncrystalline 3β-(N-tert.-butoxycarbonyl-D-α-phenylglycyl)-amino-4β-[2-(2,2,2-trichloroethoxycarbonyloxy)-ethylthio]-azetidin-2-one, thin layer chromatogram (silica gel; development with iodine vapour): Rf ~ 0.55 (system: ethyl acetate) and Rf~0.19 (system: toluene/ethyl acetate, 1:1). Infrared absorption spectrum (in methylene chloride): characteristic bands at 3.00μ, 3.35μ, 3.42μ, 5.61μ, 5.66μ, 5.85μ, 5.92μ, 6.75μ, 7.06μ, 8.14μ and 8.61μ.

A mixture of 13.5 g of glyoxylic acid tert.-butyl ester hydrate in 160 ml of toluene is dehydrated by distilling off about 80 toluene and is added to 5.29 g of 3β-(N-tert.-butoxycarbonyl-D-α-phenylglycyl)-amino-4β-[2-(2,2,2-trichloroethoxycarbonyloxy)-ethylthio]-azetidin-2-one, and the reaction mixture is warmed for 16 hours at 90°C under a nitrogen atmosphere. After cooling, it is diluted with toluene to a volume of 150 ml, washed five times with 100 ml of water at a time, dried over sodium sulphate and evaporated. The residue contains α-{3β-(N-tert.-butoxycarbonyl-D-α-phenylglycyl)-amino-4β-[2-(2,2,2,-trichloroethoxycarbonyloxy)-ethylthio]-2-oxo-1-azetidinyl}-α-hydroxy-acetic acid tert.-butyl ester and is further converted without purification.

The oily product is dissolved in 100 ml of a 1:1 mixture of tetrahydrofurane and dioxane and is treated, at about −5°C, with 2.24 ml of pyridine and, over the course of 10 minutes, wit 2,00 ml of thionyl chloride in a 1:1 mixture of tetrahydrofurane and dioxane. After standing for 30 minutes at −5°C, the cooling bath is removed; the mixture is stirred for a further hour at room temperature, filtered through a diatomaceous earth preparation and evaporated. The residue contains α-c-hloro-α-{3β-(N-tert.-butoxycarbonyl-D-α-phenylglycyl)-amino-4β-[2-(2,2,2-trichloroethoxycarbonyloxy)-ethylthio]-2-oxo-1-azetinyl}-acetic acid tert.-butyl ester and is further converted without purification.

The above crude product is dissolved in 100 ml of a 1:1 mixture of tetrahydrofurane and dioxane, 4.86 g of triphenylphosphine and 0.75 ml of pyridine are added, and the whole is warmed for 10 hours at 50°C under a nitrogen atmosphere. The dark red solution is concentrated, the residue is taken up in methylene chloride, and the mixture is twice washed with 100 ml of water and evaporated. The residue is chromatographed on 200 g of silica gel, α-{3β-(N-tert.-butoxycarbonyl-D-α-phenylglycyl)-amino-4β-[2-(2,2,2-trichloroethoxycarbonyloxy)-ethylthio]-2-oxo-1-azetidinyl}-α-triphenylphosphoranylideneacetic acid tert.-butyl ester being eluted with a 1:1 mixture of toluene and ethyl acetate; thin layer chromatogram (silica gel; development with iodine vapour): Rf~0.25 (system: toluene/ethyl acetate, 1:1), infrared absorption spectrum (in methylene chloride): characteristic bands at 3.00μ, 3.44μ, 5.67μ, 5.86μ, 5.92μ, 6.14μ and 6.76μ.

A solution of 1.74 g of α-{3β-(N-tert.-butoxycarbonyl-D-α-phenylglycyl)-amino-4β-[2-(2,2,2-trichloroethoxycarbonyloxy)-ethylthio]-2-oxo-1-azetidinyl} -α-triphenylphosphoranylideneacetic acid tert.-butyl ester in 65 ml of a 9:1 mixture of acetic acid and water is treated with 12 g of zinc dust and stirred for one hour at room temperature. The mixture is filtered through a diatomaceous earth preparation, the filtrate is evaporated, and the residue is taken up in 500 ml of ethyl acetate. The solution is twice washed with 100 ml of a saturated aqueous sodium bicarbonate solution and with 100 ml of a saturated aqueous sodium chloride solution, and the organic phase is dried over sodium sulphate and evaporated. α-[3α-(N-tert.-butoxycarbonyl-D-α-phenylglycyl)-amino-4α-(2-hydroxyethylthio)-2-oxo-1-azetidinyl]-α-(triphenylphosphoranylidene)-acetic acid tert.-butyl ester is thus obtained, thin layer chromatogram (silica gel; development with iodine vapour): Rf~ 0.29 (system: toluene/acetone, 3:2); infrared absorption spectrum (in methylene chloride): characteristic bands at 3.00μ, 3.42μ, 5.68μ, 5.86μ, 5.93μ, 6.16μ, 6.75μ and 8.75μ.

A mixture of 1.53 g of crude α-[3α-(N-tert.-butoxycarbonyl-D-α-phenylglycyl)-amino-4α-(2-hydroxyethylthio)-2-oxo-1-azetidinyl]-α-(triphenylphosphoranylidene)-acetic acid tert.-butyl ester in 60 ml of a 1:1 mixture of dimethyl sulphoxide and acetic anhydride is left to stand for 16 hours at room temperature under a nitrogen atmosphere and is then further kept for 2 hours at 50°C. It is concentrated, the residue is taken up in 500 ml of toluene, and the solution is washed three times with 100 ml of water at a time. The organic phase is dried over sodium sulphate and evaporated. The residue is chromatographed on 120 g of silica gel and 7β-(N-tert.-butoxycarbonyl-D-α-phenylglycyl)-amino-ceph-3-em-4-carboxylic acid tert.-butyl ester is eluted with a 8:2 mixture of toluene and ethyl acetate. The product crystallises from a mixture of diethyl ether and pentane, melting point 159°–161°C; $[\alpha]_D^{20} = +29° \pm 2°$ (c = 0.521 in chloroform); thin layer chromatography (silica gel; development with iodine vapour): Rf~0.67 (system: toluene/ethyl acetate, 1:1); ultra-violet absorption spectrum (in ethanol): $\lambda_{max} = 255$ mμ ($\epsilon = 5,400$); infrared absorption spectrum (in methylene chloride): characteristic bands at 2.68μ, 2.89μ, 3.33μ 5.57μ, 5.79μ, 5.88μ, 6.08μ, 6.22μ, 6.70μ, 7.15μ, 7.28μ, 7.68μ, 8.04μ, 8.64μ, 9.05μ, 9.52μ and 9.79μ.

A mixture of 0.6367 g of 7β-(N-tert.-butoxycarbonyl-D-α-phenylglycyl)-amino-ceph- 3-em-4-carboxylic acid tert.-butyl ester in 30 ml of trifluoroacetic acid is left to stand for 15 minutes at room temperature and is then mixed with 100 ml of toluene and evaporated. The residue is again taken up in 100 ml of a 3:1 mixture of toluene and methanol, the solvent is evaporated under reduced pressure, and the residue is dried under a high vacuum. The white, pulverulent residue is dissolved in 5 ml of methanol and 13 ml of a 1 percent strength solution of triethylamine in diethyl ether are added, whereupon a voluminous fresh precipitate forms. The solvent is evaporated off under reduced pressure and the residue is suspended in methylene chloride and filtered off. It is rinsed with about 150 ml of methylene chloride and dried under a high vacuum. 7β-(D-α-phenylglycyl)-amino-ceph-3-em-4-carboxylic acid is thus obtained in the zwitter-ion form as a pale yellowish, amorphous powder; thin layer chromatogram (silica gel; development with iodine vapour): Rf~0.29 (system: n-butanol/pyridine/acetic acid/water, 40:24:6:30); ultra-violet absorption spectrum (in water): $\lambda_{max} = 250$ mμ ($\epsilon = 4,300$).

We claim:

1. A compound selected from the group consisting of bis-(cis-3β-amino-2-oxo-4β-azetidinyl)-disulfide and salts thereof.

2. A compound selected from the group consisting of bis-(cis-3β-isopropylidenamino-2-oxo-4β-azetidinyl)-disulfide and salts thereof.

3. The compound bis(cis-2-oxo-3β-phenylacetylamino-4β-azetidinyl)-disulfide.

* * * * *